(12) United States Patent
Chong et al.

(10) Patent No.: US 10,582,563 B2
(45) Date of Patent: Mar. 3, 2020

(54) SERVICE DATA GROUP SENDING METHOD, APPARATUS, AND SERVER

(71) Applicant: Tencent Technology (Shenzhen) Company Limited, Shenzhen (CN)

(72) Inventors: Wang Chong, Shenzhen (CN); Tang Chu Ming, Shenzhen (CN); Zhang Bei, Shenzhen (CN); Zhu Ge Gui E, Shenzhen (CN); Peng Ying, Shenzhen (CN); Li Cui Xia, Shenzhen (CN); Li Bei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 37 days.

(21) Appl. No.: 15/715,709

(22) Filed: Sep. 26, 2017

(65) Prior Publication Data
US 2018/0020490 A1 Jan. 18, 2018

Related U.S. Application Data

(63) Continuation of application No. PCT/CN2016/092408, filed on Jul. 29, 2016.

(30) Foreign Application Priority Data

Jul. 29, 2015 (CN) .......................... 2015 1 0454782
Aug. 21, 2015 (CN) .......................... 2015 1 0520668

(51) Int. Cl.
*H04W 76/40* (2018.01)
*H04L 12/58* (2006.01)
(Continued)

(52) U.S. Cl.
CPC .......... *H04W 76/40* (2018.02); *H04L 12/185* (2013.01); *H04L 41/50* (2013.01); *H04L 51/32* (2013.01); *H04W 4/08* (2013.01); *H04W 4/80* (2018.02)

(58) Field of Classification Search
CPC ..... H04W 4/008; H04W 4/02; H04W 76/023; H04W 76/14; H04W 4/80; H04W 76/40;
(Continued)

(56) References Cited

U.S. PATENT DOCUMENTS

2007/0167136 A1* 7/2007 Groth ................... G06Q 10/109
455/41.2
2009/0119363 A1* 5/2009 Suzuki .................. G06F 16/972
709/203

(Continued)

FOREIGN PATENT DOCUMENTS

CN 102638586 A 8/2012
CN 103491083 A 1/2014
(Continued)

OTHER PUBLICATIONS

International Search Report and Written Opinion dated Oct. 28, 2016 for PCT Application No. PCT/CN2016/092408, 19 pages.
(Continued)

*Primary Examiner* — Michael Thier
*Assistant Examiner* — Prince A Mensah
(74) *Attorney, Agent, or Firm* — Brinks Gilson & Lione

(57) ABSTRACT

A method and apparatus for group sending service data group by broadcasting a pairing request, pairing with computing devices falling within a range of the short range wireless signal and accepting the pairing request, receiving input service data, generating a service data group sending request according to the service data, sending the service data group sending request to a server, and sending the
(Continued)

service data to the server. This service data group sending solution improves the efficiency of computing operations when group sending service data.

15 Claims, 18 Drawing Sheets

(51) Int. Cl.
*H04W 4/08* (2009.01)
*H04L 12/18* (2006.01)
*H04L 12/24* (2006.01)
*H04W 4/80* (2018.01)

(58) Field of Classification Search
CPC ....... H04L 12/185; H04L 41/50; H04L 51/32; H04L 67/12; H04L 67/42
See application file for complete search history.

(56) References Cited

U.S. PATENT DOCUMENTS

| | | | |
|---|---|---|---|
| 2009/0181653 A1* | 7/2009 | Alharayeri | H04W 4/02 455/414.1 |
| 2013/0171967 A1* | 7/2013 | Ashour | H04M 1/7253 455/411 |
| 2014/0040364 A1* | 2/2014 | Baldwin | H04L 65/605 709/204 |

FOREIGN PATENT DOCUMENTS

| | | |
|---|---|---|
| CN | 103609038 A | 2/2014 |
| CN | 104348875 A | 2/2015 |
| CN | 104580162 A | 4/2015 |
| CN | 104618226 A | 5/2015 |
| WO | WO 2010/129188 A2 | 11/2010 |

OTHER PUBLICATIONS

Office Action dated Aug. 5, 2019 for Chinese Application No. 201510520668.3 with concise English Translation, 9 pages.

* cited by examiner

SERVICE DATA GROUP SENDING METHOD, APPARATUS, AND SERVER

CROSS-REFERENCE TO RELATED APPLICATIONS

This application is a continuation of Patent Cooperation Treaty Patent Application No. PCT/CN2016/092408, filed on Jul. 29, 2016, which claims priority to Chinese Patent Application No. 201510520668.3, filed on Aug. 21, 2015, and to Chinese Patent Application No. 201510454782.0, filed on Jul. 29, 2015, all of which are herein incorporated by reference in their entireties.

FIELD OF THE TECHNOLOGY

The present disclosure relates to the technical field of computers, and in particular, to a method and apparatus for group sending service data.

BACKGROUND OF THE DISCLOSURE

In a social network application of conventional technology, users usually need to share service data with each other. For example, the service data may be a message (for example, an e-card), a file, a picture (for example, a photographed picture), financial data (for example, data that is an online bank account or a third party payment account and used for representing a numeric type of financial amount in practice) or virtual financial data (for example, data that is in an online game account or a social network application account and used for representing a numeric type of virtual money).

However, in the conventional technology, sharing of service data between users is usually based on a social relation chain of users (for example, users that are in the social relation chain, such as friends, group friends, alumni, or possible acquaintances). That is, a user can share the service data with only the users on the social relation chain. If it is required to group-send the service data to strangers, that is, in a situation where there is no users that are in a social relation chain in a social network application, the strangers need to be added as friends one by one, then a group is created, the strangers are added to the newly created group, and the service data is group sent by means of the group.

Therefore, in the social network application of the conventional technology, a user can implement a group sending operation only after performing a relatively large number of friend adding operations and a group creating operation when the user needs to group send service data to a plurality of strangers, resulting in less convenience in operations.

SUMMARY

A service data group sending method may include: broadcasting a pairing request by means of a short range wireless signal; pairing with receiver accounts that fall within the range of the short range wireless signal and accept the pairing request; receiving input service data; and generating a service data group sending request according to the service data, sending the service data group sending request to a server, and sending the service data to the server, so that the server group sends, according to the service data group sending request, the service data to computing devices corresponding to the receiver accounts.

A computing device may include: a memory, configured to store computer readable program code; and a processor, configured to execute the computer readable program code, so as to perform the following operations: broadcasting a pairing request by means of a short range wireless signal; pairing with receiver accounts that fall within the range of the short range wireless signal and accept the pairing request; receiving input service data; and generating a service data group sending request according to the service data, sending the service data group sending request to a server, and sending the service data to the server, so that the server group sends, according to the service data group sending request, the service data to computing devices corresponding to the receiver accounts.

A method for forwarding service data between computing devices may include: acquiring a sender account and receiver accounts, the receiver accounts falling within the range of a short range wireless signal of a computing device corresponding to the sender account and accepting a pairing request broadcast by the computing device corresponding to the sender account; receiving a service data group sending request uploaded by the computing device corresponding to the sender account, and acquiring service data according to the service data group sending request; and sending the service data to computing devices corresponding to the receiver accounts.

A server may include: a memory, configured to store computer readable program code; and a processor, configured to execute the computer readable program code, so as to perform the following operations: acquiring a sender account and receiver accounts, the receiver accounts falling within the range of a short range wireless signal of a computing device corresponding to the sender account and accepting a pairing request broadcast by the computing device corresponding to the sender account; receiving a service data group sending request uploaded by the computing device corresponding to the sender account, and acquiring service data according to the service data group sending request; and sending the service data to computing devices corresponding to the receiver accounts.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
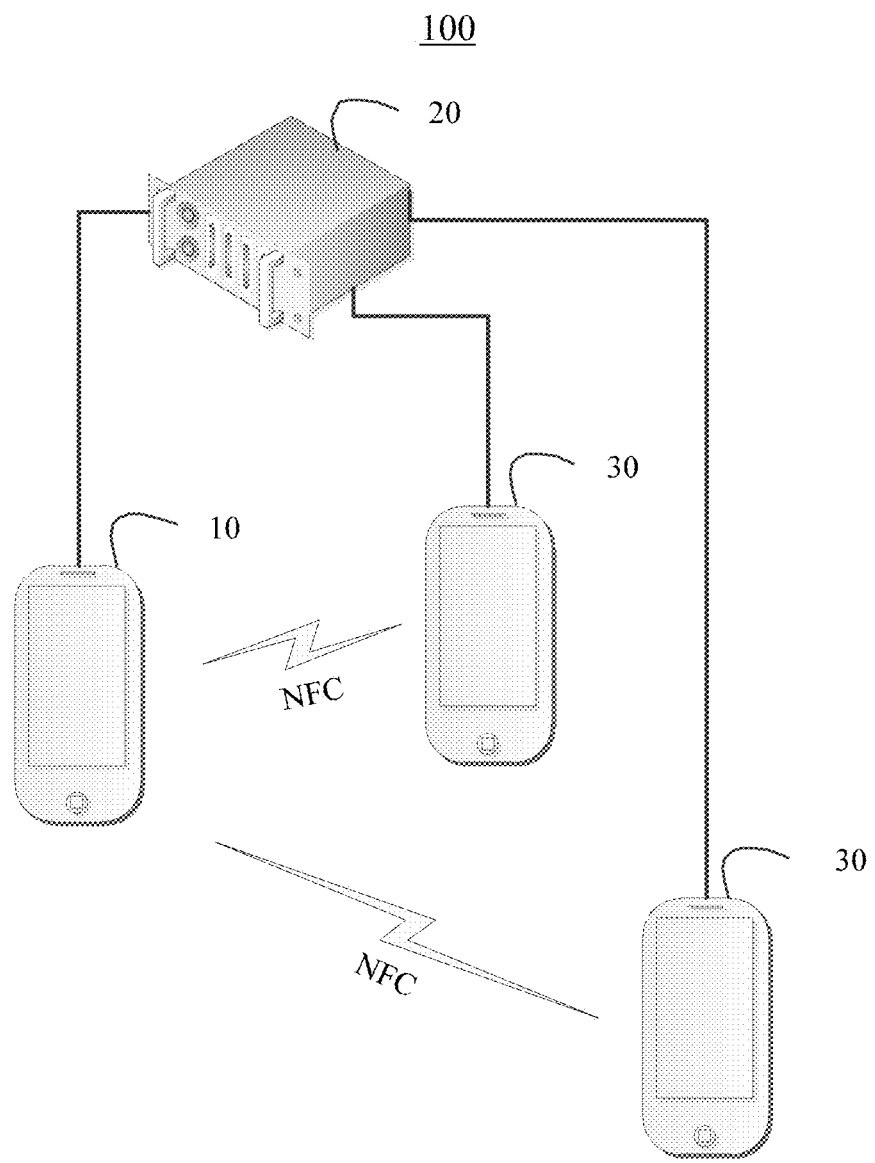
FIG. 1 is a networking diagram of a service data group sending system according to an embodiment.

Based on the above, to resolve the problem of less convenience in operations caused by the fact that in the social network application of the conventional technology, a user can implement a group sending operation only after performing a relatively large number of friend adding operations and a group creating operation when the user needs to group send service data to a plurality of strangers, in an embodiment, a service data group sending solution is particularly provided. As shown in FIG. 1, the service data group sending solution is based on a computer system 100 shown in FIG. 1. The computer system 100 includes a computing device 10 of a sender account in the service data group sending process, a server 20 that is responsible for service data forwarding, and computing devices 30 of receiver accounts in the service data group sending process.

The service data group sending mechanism is divided into three parts, including a service data group sending method run on the computing device 10 of the sender account, a method for forwarding service data between computing devices and run on the server 20, and a method for receiving the group sent service data and run on the computing devices 30 of the receiver accounts. The computing device 10 of the sender account and the computing devices 30 of the receiver accounts may be Von Neumann Architecture-based computer systems in which a short range wireless communication component, such as a near field communication (NFC) component, a Bluetooth component, a WiFi component, or a Zigbee component, is mounted, for example, a smart phone, or a tablet computer. The server 20 that is responsible for service data forwarding may be a server device of a social network application.

The service data group sending method run on the computing device 10 of the sender account, the method for forwarding service data between computing devices and run on the server 20, and the method for receiving the group sent service data and run on the computing devices 30 of the receiver accounts may depend on computer programs. Moreover, the service data group sending method run on the computing device 10 of the sender account and the method for receiving the group sent service data and run on the computing devices 30 of the receiver accounts may be client programs based on a social network application. The method for forwarding service data between computing devices and run on the server 20 may be a service program based on the social network application.

Figure 2:
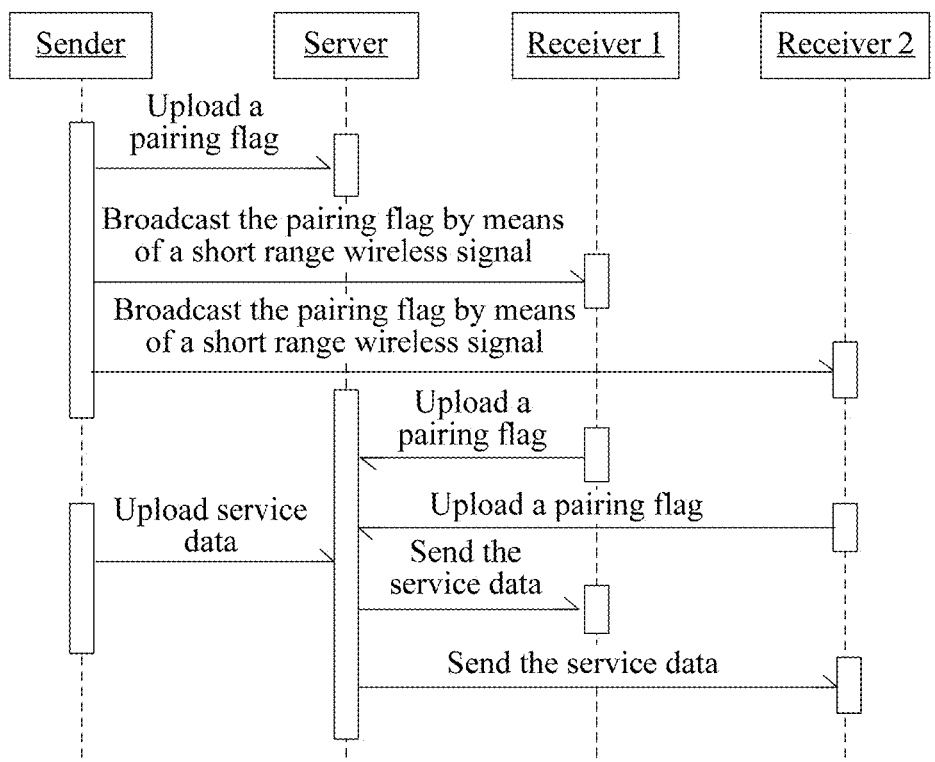
FIG. 2 is a timing diagram of an interaction process among a sender, a receiver, and a server in the service data group sending system.

Specifically, the interaction process of the service data group sending mechanism may be described by the service data group sending method shown by the flow diagram 200 in FIG. 2.

Figure 3:
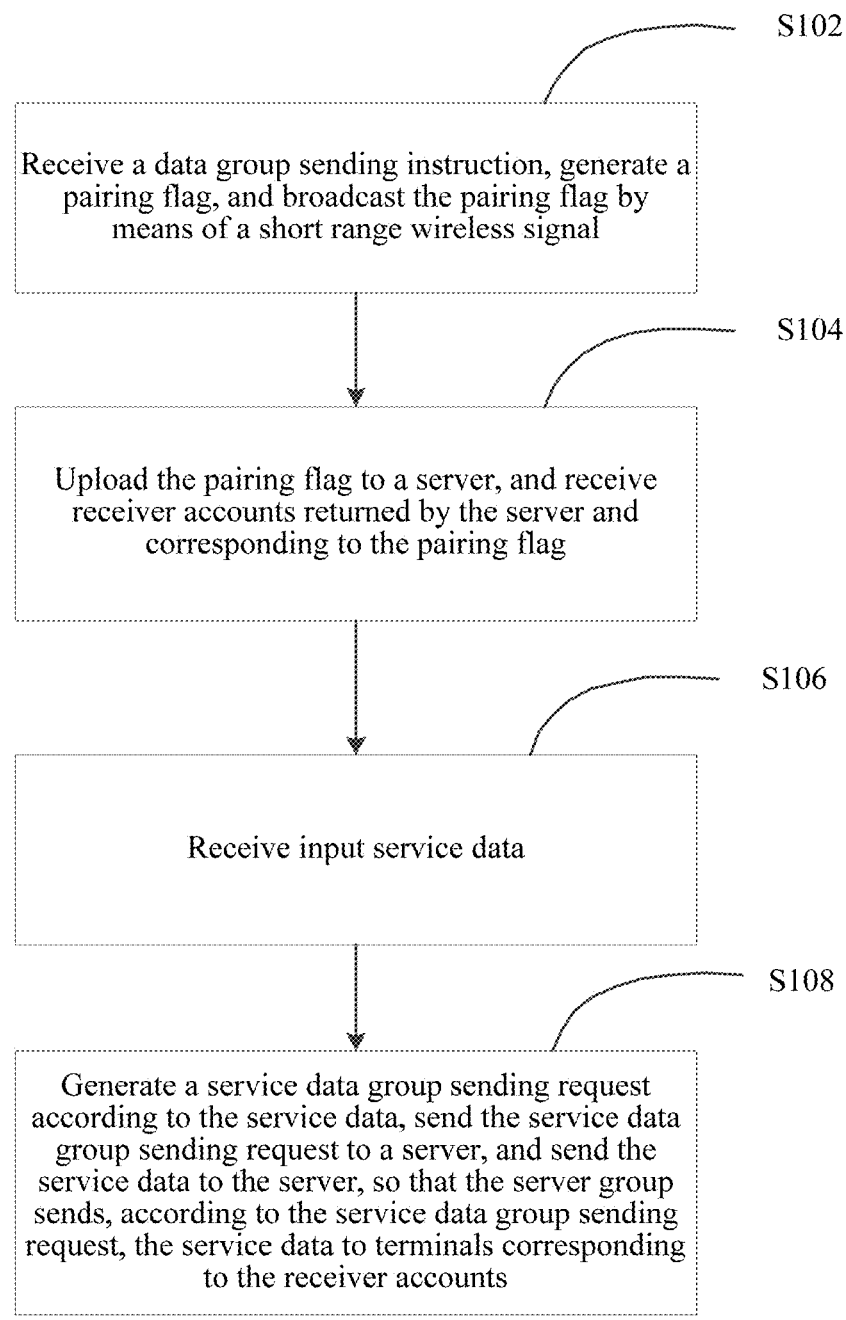
FIG. 3 is a flowchart of a service data group sending method according to an embodiment.

The service data group sending method run on, for example, the computing device 10 of the sender account may be described by the flow chart 300 shown in FIG. 3, and include:

Step S102: Receive a data group sending instruction, generate a pairing flag, and broadcast the pairing flag by means of a short range wireless signal.

A user as a sender of service data may input a data group sending instruction to a smart computing device to enable a service data group sending function if the user wants to group send service data to strangers. In this embodiment, the sender needs to log on a server on a computing device 10 by using an account of a social network application before group sending the service data. The logon user account is a sender account. After the sender inputs the data group sending instruction, the computing device generates a pairing flag. The pairing flag may be used for creating a mapping with a computing device of a stranger. A target of the service data group sent by the computing device corresponding to the sender account is a computing device that is of another user account and stores the same pairing flag as the computing device corresponding to the sender account.

In this embodiment, after generating the pairing flag, the computing device of the sender account may send, by means of a short range wireless signal, the pairing flag to the computing device corresponding to the another user account. The short range wireless signal may be a wireless signal that is transmitted within tens of meters (or other corresponding range of a short range wireless communication protocol), such as an NFC signal, a Bluetooth signal, a WiFi signal (a network neighborhood on a wireless local network), or a Zigbee signal. For example, if an NFC chip is mounted on a smart computing device, the smart computing device may broadcast a pairing flag to another computing device by means of an NFC signal. Another user may create a connection with the computing device of the sender by means of detecting a short range wireless signal by approaching the computing device to the computing device of the sender, so as to receive the pairing flag. The user account of the social network application logged on the computing device may be referred to as a receiver account.

Step S104: Upload the pairing flag to a server, and receive receiver accounts returned by the server and corresponding to the pairing flag.

In this embodiment, the computing device of the sender account may upload the pairing flag to the server by means of a pairing initiating request. The server receives the pairing flag. The pairing initiating request may also carry the sender account, or the server may obtain, through a connection established with the computing device of the sender account, a session target including the sender account, and then acquire the sender account by means of the session target.

As stated above, a computing device that acquires the pairing flag the same as that of the sender account by performing near field contact with the computing device of the sender account and detecting the short range wireless signal may also establish a connection with the server, and send the same pairing flag to the server by means of a pairing and adding request. The server may then search for a user account that has a pairing flag the same as that of the sender account by comparing pairing flags. The user account is a receiver account in the service data group sending.

That is, a computing device of a user still cannot be used as the receiver of the service data for receiving the service data in a situation in which no user account logs on a computing device of the user, or a computing device of the user is not connected to a network and is incapable of establishing a connection with the server, that is, the server is incapable of receiving a pairing and adding request or the received pairing and adding request does not include a user account, even if the user has obtained the pairing flag by approaching the computing device to the computing device of the sender account.

Correspondingly, if the user has obtained the pairing flag by approaching the computing device to the computing device of the sender account, established a connection with the server, and successfully uploaded a pairing and adding request including the pairing flag, and the server has acquired the user account that logs on the computing device used by the user, the user account can be used as the receiver account for receiving the group sent service data no matter whether the user account is in a social relation chain with the sender account (in a situation in which strangers are included for the sender).

After receiving the receiver accounts returned by the server, the computing device of the sender account may present the receiver accounts in a pairing state display interface. It should be noted that the processing of receiving, by the computing device of the sender account, the receiver accounts returned by the server may be a continuous process. That is, each time the server receives a user account having a pairing flag the same as that of the sender account, and server may buffer the user account as a receiver account, and return the receiver account to the computing device of the sender account. The computing device of the sender account may successively receive a plurality of receiver accounts, and may successively add the receiver accounts to the pairing state display interface for check by the initiator.

The initiator may check all of the receiver accounts in the pairing state display interface and perform deletion after selecting a receiver account. The computing device of the sender account sends to the server a receiver account that is deleted by the initiator, so that the server deletes the receiver account from a cache, and subsequently the server does not send to the user account the service data group sent by the initiator.

Step S106: Receive input service data.

A service data input interface may be presented for an initiator to enter service data. The input service data may be in a plurality of data formats, for example, in types of a file, a picture, a numeric, or the like.

For example, in an application scenario, if an initiator wants to group send a file in a web disk to a plurality of other users, the initiator may enter a network storage path of the file in the web disk.

In another application scenario, if an initiator wants to group send a photo stored locally to a plurality of other users, the service data input interface may provide a photo option box and the initiator may first select a local phone file on the service data input interface as a service data input, then upload the photo file to a network storage location, such as a server or a third party storage server, obtain a returned network storage path of the photo file, and then use the network storage address as a service data input.

In an application scenario of mobile payment, the service data may also be of a numeric type, for example, a payment amount or a transfer amount. The service data is numeric data capable of being transferred between a sender account and a receiver account.

It should be noted that the sequence between step S106 and step S102 or step S104 may not be strictly defined, and may change in order. The initiator may first input the data group sending instruction to generate the pairing flag and find the computing devices of the receiver accounts, and then input the service data in the presented service data input interface. The initiator may also input the service data in the presented service data input interface, and then input the data group sending instruction to generate the pairing flag and find the computing devices of the receiver accounts. The two steps are not conflict with each other.

Step S108: Generate a service data group sending request according to the service data, send the service data group sending request to the server, and send the service data to the server, so that the server group sends, according to the service data group sending request, the service data to computing devices corresponding to the receiver accounts.

Figure 4:
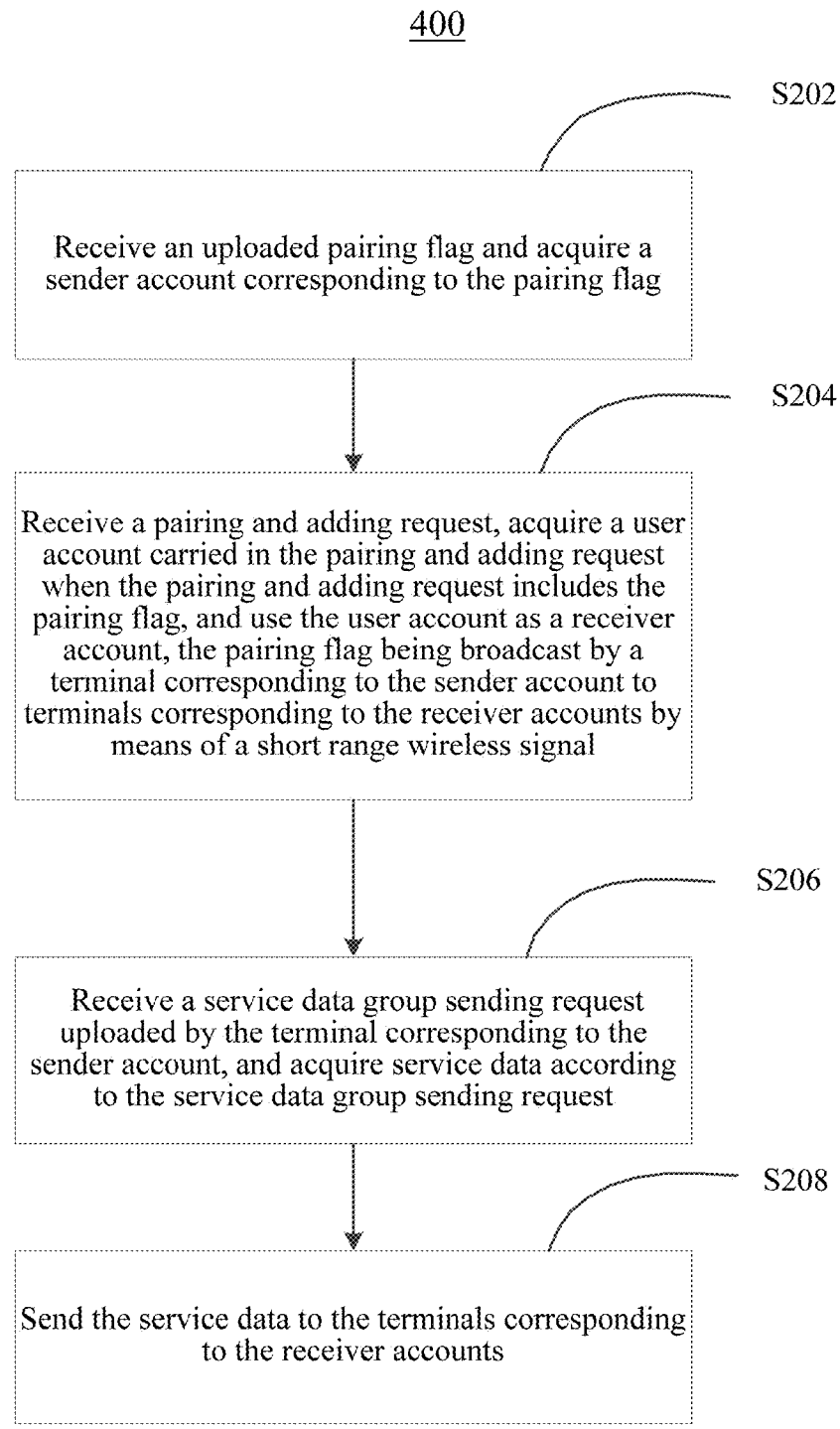
FIG. 4 is a flowchart of a method for receiving group sent service data according to an embodiment.

In another aspect, a method for forwarding service data between computing devices performed by a server may be described by the flow chart 400 shown in FIG. 4. The method includes:

Step S202: Receive an uploaded pairing flag and acquire a sender account corresponding to the pairing flag.

Step S204: Receive a pairing and adding request, acquire a user account carried in the pairing and adding request when the pairing and adding request includes the pairing flag, and use the user account as a receiver account, the pairing flag being broadcast by a computing device corresponding to the sender account to computing devices corresponding to the receiver accounts by means of a short range wireless signal.

Step S206: Receive a service data group sending request uploaded by the computing device corresponding to the sender account, and acquire service data according to the service data group sending request.

Step S208: Send the service data to the computing devices corresponding to the receiver accounts.

Figure 5:
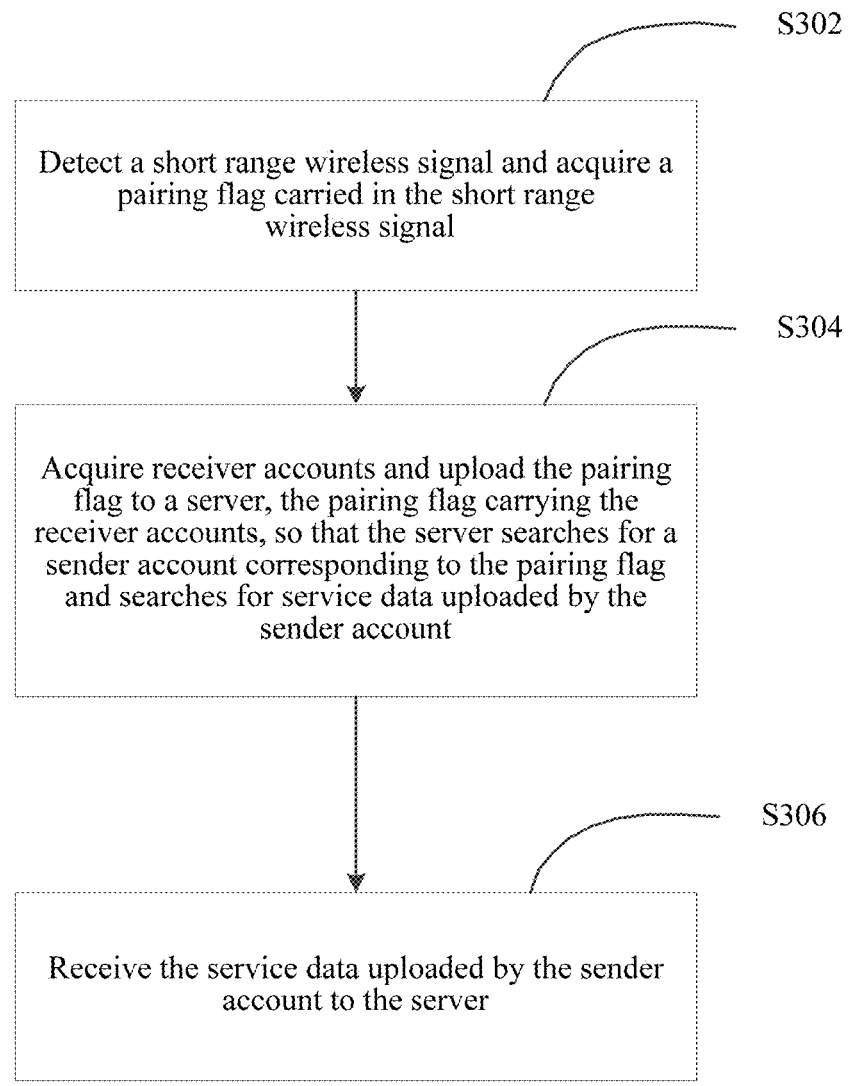
FIG. 5 is a flowchart of a method for forwarding service data between computing devices according to an embodiment.

The method for receiving group sent service data performed by computing device of receiver accounts may be shown in FIG. 5. The method includes:

Step S302: Detect a short range wireless signal and acquire a pairing flag carried in the short range wireless signal.

Step S304: Acquire receiver accounts and upload the pairing flag to a server, the pairing flag carrying the receiver accounts, so that the server searches for a sender account corresponding to the pairing flag and searches for service data uploaded by the sender account.

That is, after the initiator inputs the data group sending instruction, generates the pairing flag, and uploads the pairing flag to the server, the pairing flag may be broadcast within a relatively small space range by means of a short range wireless signal. If another user wants to receive the group sent service data, the another user may approach a handheld computing device (on which a user account needs to log first) to a mobile phone of the sender, so as to detect the short range wireless signal, then extract the pairing flag carried in the short range wireless signal, generate a pairing and adding request, and send the pairing and adding request to the server. In this case, the logon user account corresponding to the pairing and adding request is the receiver account.

Preferably, before sending the pairing and adding request to the server, the computing device of the receiver account may further present a verification box and the receiver needs to enter, in the verification box, verification information corresponding to the pairing flag. For example, if the pairing flag is a random number "32452", the initiator may observe the pairing flag, and then orally inform a user of the number. If the user wants to become the receiver, a computing device of the user presents a verification box before sending the pairing and adding request to the server, and the user needs to manually enter "32452" (which is informed by the initiator orally). If the verification succeeds, the user may continuously send the pairing and adding request to the server. It indicates that the receiver is a user invited by the initiator, instead of a user "who overhears the pairing flag".

Step S306: Receive the service data uploaded by the sender account to the server.

In the foregoing embodiment, if the service data input by the initiator is a network storage address or service data of a numeric type and used for online payment, the service data may be sent to the server by means of a service data group sending request. If the service data input by the initiator is a file such as a local photo or an audio, the file may be first uploaded to a network storage location such as a server or a third party storage server, a returned network storage path of the photo file is obtained, then a service data group sending request is generated according to the returned network storage path and an actual network storage path corresponding to the service data, and the service data group sending request is sent to the server.

In an embodiment, after receiving the service data group sending request, the server may extract the service data or the network storage path of the service data according to the service data group sending request, and then send the service data or the network storage path of the service data to computing devices of receiver accounts stored in a cache, so that the computing devices corresponding to the receiver accounts download the service data according to the network storage path.

In an application scenario, if the service data input by the initiator is a network storage path of a file in a web disk, the server may group send the network storage path to all receiver accounts, and computing devices of the receiver accounts may download the corresponding file according to the network storage path.

In another application scenario, if the service data input by the initiator is a photo, an audio, or a video stored locally, the service data group sending request includes a network storage path of the input photo, audio, or video, and the server may group send the network storage path to all receiver accounts, and computing devices of the receiver accounts may download the corresponding photo, audio, or video according to the network storage path.

In another embodiment, the data type of the service data may be numerical. The step of receiving input service data further includes:

receiving input service data that is corresponding to the sender account and of which the data type is numerical, so that the server performs service numeric transfer between the sender account and the receiver accounts according to the service data.

The service numeric transfer is transfer of the service data of the numeric type from an attribute value of the sender account to an attribute value of the receiver account. For example, in an application scenario of mobile payment, if the service data is a payment amount 100, the service numeric transfer is deducting the numeric 100 from the payment balance of the sender account and then adding the numeric 100 to the payment balance of the receiver account. Moreover, the operation is a transactional operation. If adding of the numeric 100 to the payment balance of the receiver account fails after deducting of the numeric 100 from the payment balance of the sender account is completed, the operation is rolled back, and the deducted numeric 100 is returned back to the payment balance of the sender account.

For example, in an application scenario, the initiator may input the service data as the numeric 100 corresponding to each receiver account. After inputting a data group sending instruction, the initiator may perform short range wireless communication with computing devices of a plurality of users sequentially to transmit a pairing flag. The payment balance of each receiver account may be added by the numeric 100, and the payment balance of the sender account is deducted by the numeric 100 each time one receiver account is added.

In this embodiment, after completing the service numeric transfer between the sender account and the receiver account, the server may send to the receiver account prompt information corresponding to the service numeric transfer for notifying. For example, in the foregoing embodiment, after the service numeric transfer is completed, if the payment balance of the receiver account is added by the numeric 100, the server may inform the computing device of the receiver account of the increase of the numeric 100 in the payment balance of the receiver.

Further, the initiator may also input a quota parameter when inputting the service data. That is, the computing device of the sender account may receive the input quota parameter in the process of receiving the input service data that is corresponding to the sender account and of which the data type is numerical.

In the step of generating a service data group sending request according to the service data and sending the service data group sending request to the server, the quota parameter may be added to the service data group sending request.

The server may divide the service data into a set of sub-numerics according to the quota parameter, and extract sub-numerics from the set of sub-numerics for the receiver accounts for performing service numeric transfer.

In this case, the service data can be managed better by dividing the service data into a plurality of pieces.

Figure 6:
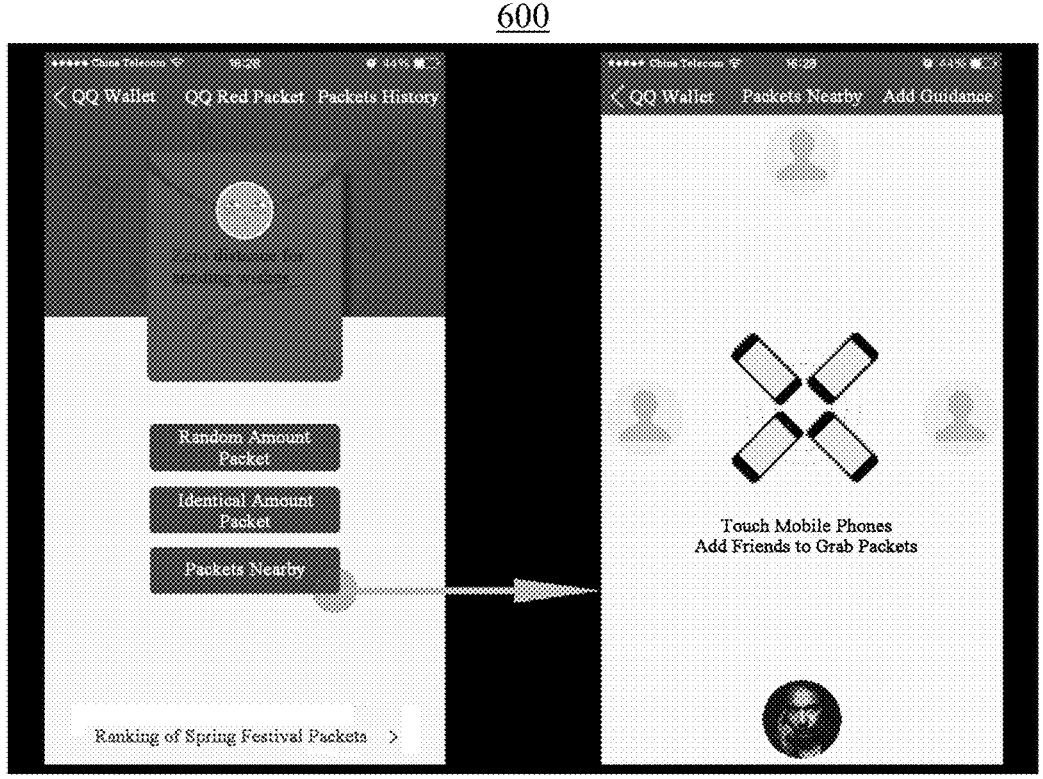
FIG. 6 is a schematic diagram of a display interface for inputting a data group sending instruction in an application scenario of sending a red packet.

For example, in an application scenario of group sending red packets, where the red packets are representative of the red packets or enveloped used to gift money (that is, an initiator generates electric red packets by using a part of a payment balance of a logon sender account, the electric red packets including data of payment amount, then correspondences are established between the data of the electric red packets and other users, and the server transfers the payment amount in the electric red packets to payment balances of other user accounts). As provided by the exemplary graphical user interface (GUI) 600 shown in FIG. 6, a user as an initiator may input a data group sending instruction by tapping "Packets Nearby" on a mobile phone interface. The mobile phone interface presents prompt information indicating that the NFC is enabled and instructing near field contact with another computing device (that is, "Touch" another computing device). At this time, the mobile phone of the user as the initiator has generated a pairing flag and broadcasts the pairing flag to other computing devices nearby by means of a short range wireless signal such as an NFC signal.

After detecting the NFC signal and extracting the pairing flag, a mobile phone near the mobile phone of the user as the initiator may initiate to the server a pairing and adding request including the pairing flag. The server determines, according to the pairing flag, a user account that initiates the pairing and adding request as the receiver account, so as to establish a mapping between the sender account and the receiver account by means of the pairing flag. The server may return the receiver account to the computing device of the sender account. The receiver account may be presented on the computing device of the sender account.

Figure 7:
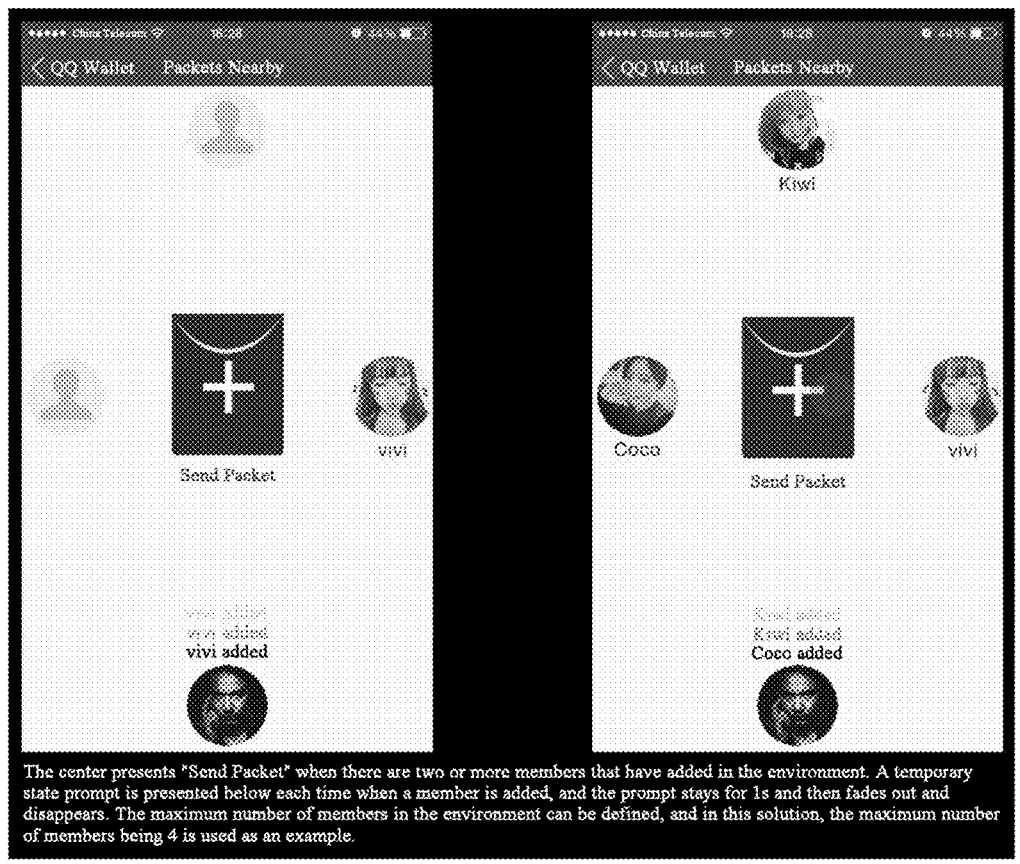
FIG. 7 is a schematic diagram of a display interface that presents receiver accounts in an application scenario of sending red packets.

For example, as provided by the exemplary GUI 700 shown in FIG. 7, the GUI 700 presents receiver accounts on a computing device relating to a sender account. The user accounts such as Vivi and Coco are receiver accounts successively returned by the server. That is, the initiator may first send a pairing flag to Vivi by means of NFC. After receiving the pairing flag, Vivi sends the pairing flag to the server, so as to become the receiver account of the initiator. The server may first deliver the receiver account Vivi to the computing device of the initiator. After then, Coco also receives the pairing flag and sends the pairing flag to the server, so as to become the receiver account of the initiator. The server may continuously deliver the receiver account Coco to the computing device of the initiator.

Further, in this embodiment, a relation chain adding instruction may further be received by means of the display interface that presents the receiver accounts, and a receiver account that is corresponding to the relation chain adding instruction and selected on the display interface is acquired. A relation chain adding request is generated according to the selected receiver account and sent to the server, so that the server establishes a relation chain mapping between the sender account and the selected receiver account.

That is, if the initiator wants to add Coco as a friend, the initiator selects the portrait of Coco on the display interface that presents the receiver accounts, and initiates a friend adding application in a popup menu bar, thereby facilitating social association establishment between users.

Figure 8:
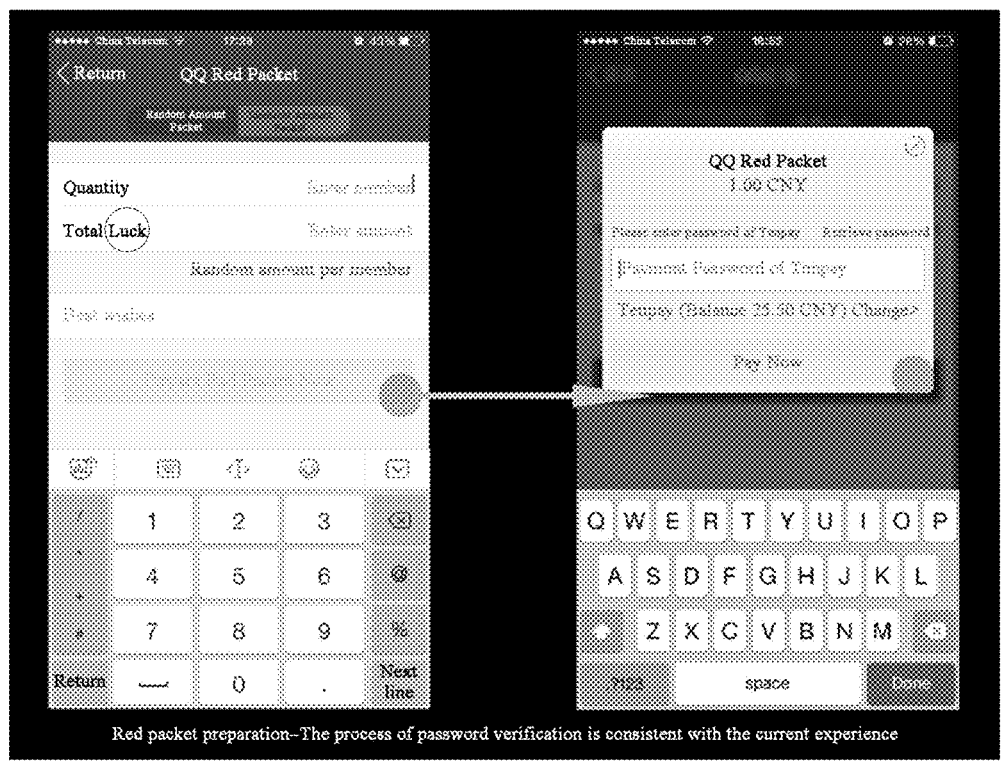
FIG. 8 is a schematic diagram of a service data input interface in an application scenario of sending a red packet.

Further, as provided by the exemplary GUI 800 shown in FIG. 8. The initiator may input the service data by typing "Send Red Packet" on the interface. In addition or alternatively, a service data input interface may be presented after the user taps a "Send Red Packet" icon. As shown in FIG. 8, the service data input interface in the application scenario is a red packet amount input interface. The "Quantity" entered by the initiator is the quota parameter referencing a quantity of red packets, the "Total" entered by the initiator is the input service data, and is a payment amount of a numeric type referencing a total value included in the electric red packet. After the initiator submits the "Quantity" and the "Total" to the server, the server may obtain the quota parameter and the service data.

Preferably, after the step of receiving the input service data that is corresponding to the sender account and of which the data type is numerical, an identity verification window may also be presented. Input identity verification information corresponding to the sender account is acquired by means of the identity verification window, and is sent to the server for verification. When a verification successful message returned from the server is received, the step of generating a service data group sending request according to the service data and sending the service data group sending request to the server is performed.

As shown by the exemplary GUI 800 in FIG. 8, with respect to the service data of the payment type in the foregoing embodiment, the initiator needs to perform identity verification before confirming group sending. The identity verification information may be a password corresponding to the sender account or a third party payment account and password corresponding to the sender account. The server is allowed to deduct corresponding service data from the payment balance of the sender only after the verification succeeds.

The service data may divide the service data into a set of sub-numerics according to the quota parameter. For example, if the total amount is 200 and the quantity of red packets is 10, the server may divide the service data 200 into 10 parts. The dividing method may be even dividing (in a situation of delivering fixed red packets, the initiator may set the amounts of the red packets at a time, thereby improving convenience), random dividing (in a situation of red packet grabbing, the amount of money in the red packet acquired by each receiver is a random value, thereby increasing interest), or dividing by means of a preset allocation rule (for example, a relatively large sub-numeric is allocated to a female receiver and a relatively small sub-numeric is allocated to a male receiver, or a relatively large sub-numeric is allocated to a receiver whose age is smaller than a threshold).

After the red packets are divided by the server, for example, in the foregoing embodiment, after the service data 200 is equally divided into 10 parts using an even dividing method, the set of sub-numerics is a set of 10 sub-numerics each with an amount of 20. Each time the server receives a pairing and adding request and determines a receiver account, one sub-numeric with the amount of 20 is extracted from the set of sub-numerics, and service numeric transfer with the service amount of 20 is performed between the sender account and the receiver accounts (in other embodiments, the transfer not only includes transferring the amount 20 from the payment balance of the sender account to the payment balance of the receiver account, but also includes transferring an amount from the payment balance of the receiver account to the payment balance of the sender account, for example, in the application scenario of wallet begging).

Correspondingly, the computing device of the sender account may also receive a receiver account that is returned by the server and of which the receive state is received and present on the display interface a prompt effect for the received receiver account.

Figure 9:
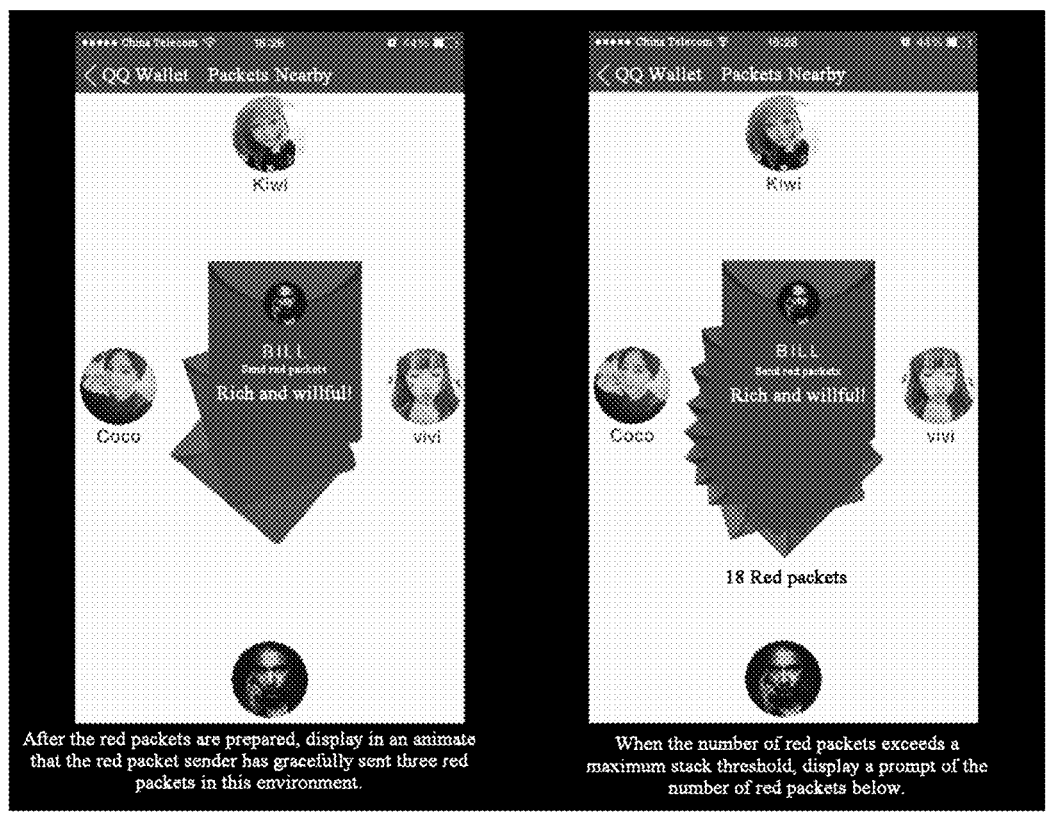
FIG. 9 is a schematic interface diagram presenting a process of delivering red packets in an application scenario of sending red packets.

For example, as provided by the exemplary GUI 900 shown in FIG. 9, after an initiator who delivers red packets enters a quota parameter and a total amount on a computing device of a sender account, succeeds in identity verification, and sends a service data group sending request to a server, a quantity of red packets and a dynamic image showing that the red packets are flying towards portraits of receiver accounts may be presented on a display interface that presents the receiver accounts. If the receiver account that is returned by the server and received by the computing device of the sender account and of which the receive state is Vivi, a dynamic image showing that the portrait of Vivi receives the coming red packet, so as to remind the initiator of that Vivi has received the red packet.

Correspondingly, a computing device of the receiver account may also present portraits of the sender account and other receiver accounts. After completing the service numeric transfer to the receiver account, the server sends prompt information to the receiver account, and the computing device of the receiver account may present the prompt information. For example, the mobile phone display interface of Vivi may also present portraits of the initiator "BILL" and another receiver Coco. After the server completes the process of transferring the payment amount of 20 from the account of the initiator BILL to the account of the receiver Vivi, the mobile phone display interface of Vivi presents that Vivi has receive a red packet with an amount of 20.

In another application scenario of delivering electric red packets, a red packet grabbing method may be used. That is, after an initiator enters a quota parameter 10 and service data 200 and uploads the quota parameter 10 and the service data 200 to a server, the server may randomly divide the numeric 200, to obtain 10 sub-numerics with random amounts, to construct a set of sub-numerics.

In the application scenario, a mobile phone display interface of a computing device of a receiver account, for example, Vivi and Coco in the foregoing embodiment, may present prompt information sent by the server, such as information of the total amount of 200 and the quantity of red packets of 10, and present an icon or key for grabbing a red packet. When the receiver presses or trigger the icon or key, the receiver enters an application receive instruction. That is, the computing device of the receiver account may receive the input application receive instruction and upload the application receive instruction to the server, the application receive instruction carrying a timestamp. The server may extract sub-numerics from the service data according to a sequence of received timestamps and perform service numeric transfer between the sender account and the receiver account. That is, the server may receive the application receive instructions uploaded by the computing devices corresponding to the receiver accounts, extract the first timestamps, and sequentially send the service data to the computing devices corresponding to the receiver accounts according to the sequence of the first timestamps.

In the foregoing case, the receiver accounts may be sorted by using the first timestamps, and then the service data is sequentially sent to the computing devices corresponding to the receiver accounts, thereby avoiding disorder.

For example, in the foregoing embodiment, Vivi and Coco are both receiver accounts, Vivi first taps the icon or key of opening a red packet, and then coco taps the icon or key of opening a red packet. Therefore, the mobile phone of Vivi first uploads an application receive instruction to the server. The time when the server receives the application receive instruction of Vivi is earlier than that of Coco. Therefore, one sub-numeric is first extracted from the set of sub-numerics. That is, the set of sub-numerics corresponds to a set of 10 electric red packets and one electric red packet is randomly selected from the 10 electric red packets and is delivered to Vivi. After one electric red packet is delivered to Vivi, an application receive instruction uploaded by Coco may be processed, and one electric red packet is extracted from the remaining nine red packets and is delivered to Coco. That is, a receiver account that uploads an application receive instruction previously preferably obtains, through distribution, a sub-numeric from the set of sub-numerics, for performing service numeric transfer.

Further, in this embodiment, if the quota parameter input by the initiator is 10 and the quantity of receiver accounts is greater than 10, some receiver accounts may not able to receive corresponding sub-numerics from the set of sub-numerics. To better group send service data, the following solution may be implemented:

In a first solution, the server may acquire a quantity of receivers of the receiver accounts when acquiring the user accounts carried in the pairing and adding requests as the receiver accounts. In addition, when extracting sub-numerics from the set of sub-numerics for performing service numeric transfer to the receiver accounts, the server may determine whether the quantity of receivers is greater than the quota parameter, and return receive failure prompt information to the receiver accounts if the quantity of receivers is greater than the quota parameter.

That is, in an application scenario in which the initiator first inputs service data and then generates a pairing flag for matching a computing device of a receiver account, if the server detects that the quantity of receivers is greater than the input quota parameter, the server returns data receive failure prompt information to the computing device of the receiver account. For example, in the foregoing embodiment, if Coco is the eleventh receiver account, prompt information indicating that all of the red packets are grabbed is presented after Coco taps the key for grabbing a red packet.

By the foregoing solution, a plurality of service data can be managed better, and in a situation in which the quantity of receivers is greater than the quota parameter, data receive failure prompt information is returned back to the computing device of the receiver account, thereby avoiding blindly repeated requesting by the receiver due to that the receiver does not know that the service data is null.

In a second solution, the server sends the service data to the computing devices corresponding to the receiver accounts. The server may also determine whether the set of sub-numerics is null, and return receive failure prompt information to the receiver accounts if the set of sub-numerics is null.

That is, each time the server processes one application receive instruction, the server extracts one sub-numeric from the set of sub-numerics and performs service numeric transfer according to the sub-numeric. When all of the sub-numerics in the set of sub-numerics are extracted and therefore the set of sub-numerics is null, that is, when the service data of the numeric type is entirely transferred, the server may return data receive failure prompt information to the computing device of the receiver account. For example, in the foregoing embodiment, when the server extracts a sub-numeric for Coco and the service data of the total amount of 200 is transferred, that is, the divided 10 electric red packets are all delivered, prompt information indicating that all of the red packets are grabbed is presented after Coco taps the key for grabbing a red packet.

By the foregoing solution, a plurality of service data can also be managed better, and in a situation in which the quantity of receivers is greater than the quota parameter, data receive failure prompt information is returned back to the computing device of the receiver account, thereby avoiding blindly repeated requesting by the receiver due to that the receiver does not know that the service data is null.

Further, when receiving the service data group sending request, the server may also acquire a second timestamp when the service data group sending request is received.

The server may also determine whether the second timestamp is expired; and acquire a remaining sub-numeric in the set of sub-numerics, return the remaining sub-numeric to the sender account, and send prompt information to the computing device corresponding to the sender account if the second timestamp is expired.

In the foregoing embodiment, if the user enters the total amount of 200 and the total quantity of red packets of 10, but only six computing devices of receiver accounts are found nearby, there are still four remaining red packets that are not delivered to other users after delivering of the red packets. The server may measure duration to the second timestamp. The duration is a period of time for which the divided electric red packets exist. If the duration for which the electric red packets that are not delivered exist is excessively long, the server may end the service data group sending this time, transfer the remaining payment amount in the four remaining red packets still back to the sender account, and send a notification to the computing device of the sender account. The computing device of the sender account may present the prompt information to prompt the user of that this red packet delivering activity is ended and the payment amount in the electric red packets that are not delivered is returned back to the sender account.

By the foregoing solution, the service data is returned back to the sender account by determining whether a time is expired, thereby avoiding unnecessary loss of the sender account.

Figure 10:
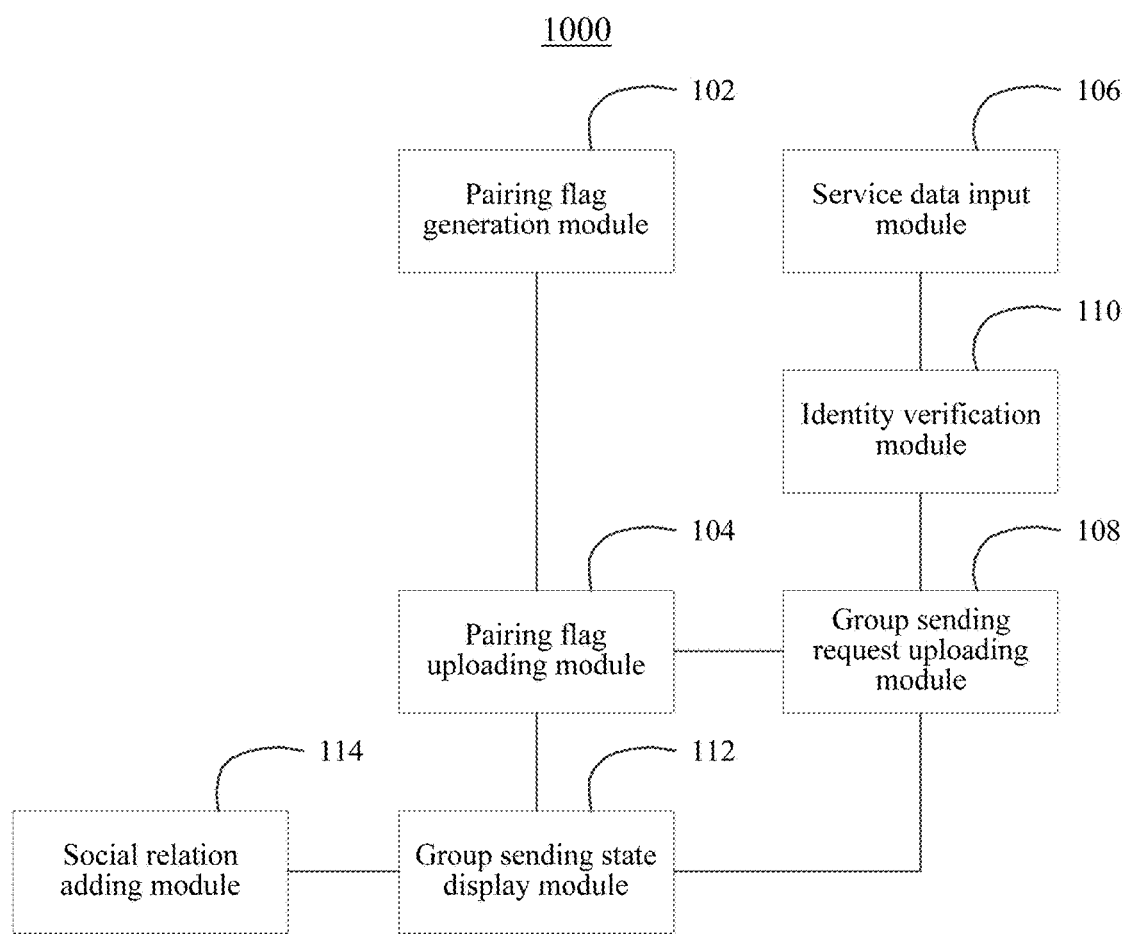
FIG. 10 is a schematic structural diagram of a service data group sending apparatus according to an embodiment.

To resolve the problem of less convenience in operations caused by the fact that in the social network application of the conventional technology, a user can implement a group sending operation only after performing a relatively large number of friend adding operations and a group creating operation when the user needs to group send service data to a plurality of strangers, in an embodiment, as provided by the block diagram 1000 of a service data group sending apparatus shown in FIG. 10, the service data group sending apparatus corresponding to the foregoing service data group sending method is particularly provided. The apparatus includes: a pairing flag generation module 102, a pairing flag uploading module 104, a service data input module 106, and a group sending request uploading module 108.

The pairing flag generation module 102 is configured to receive a data group sending instruction, generate a pairing flag, and broadcast the pairing flag by means of a short range wireless signal.

The pairing flag uploading module 104 is configured to upload the pairing flag to a server, and receive receiver accounts returned by the server and corresponding to the pairing flag.

The service data input module 106 is configured to receive input service data.

The group sending request uploading module 108 is configured to generate a service data group sending request according to the service data and send the service data group sending request to the server, so that the server group sends, according to the service data group sending request, the service data to computing devices corresponding to the receiver accounts.

In an embodiment, the service data input module 106 may also be configured to acquire a network storage path of the service data.

The group sending request uploading module 108 is further configured to generate a service data group sending request according to the network storage path of the service data and send the service data group sending request to the server, so that the server group sends the network storage path to the computing devices corresponding to the receiver accounts, and the computing devices corresponding to the receiver accounts download the service data according to the network storage path.

In an embodiment, the pairing flag uploading module 104 is further configured to acquire a sender account and upload the sender account. The service data input module 106 is further configured to receive input service data that is corresponding to the sender account and of which the data type is numerical, so that the server performs service numeric transfer between the sender account and the receiver accounts according to the service data.

In an embodiment, the service data input module 106 is further configured to receive an input quota parameter. The group sending request uploading module 108 is further configured to add the quota parameter to the service data group sending request, so that the server divides the service data into a set of sub-numerics according to the quota parameter and extracts sub-numerics from the set of sub-numerics for the receiver accounts for performing service numeric transfer.

In an embodiment, as provided by the block diagram 1000 shown in FIG. 10, the apparatus further includes an identity verification module 110, configured to present an identity verification window, acquire input identity verification information corresponding to the sender account by means of the identity verification window, send the identity verification information to the server for verification, and invoke the group sending request uploading module when receiving a verification successful message returned by the server.

In an embodiment, as by the block diagram 1000 shown in FIG. 10, the apparatus further includes a group sending state display module 112, configured to present the receiver accounts on a display interface, receive a receiver account that is returned by the server and of which the receive state is received, and present on the display interface a prompt effect for the received receiver account.

In an embodiment, as by the block diagram 1000 shown in FIG. 10, the apparatus further includes a social relation adding module 114, configured to receive a relation chain adding instruction by means of the display interface, acquire a receiver account corresponding to the relation chain adding instruction and selected on the display interface, generate a relation chain adding request according to the selected receiver account, and send the relation chain adding request to the server, so that the server establishes a relation chain mapping between the sender account and the selected receiver account.

Figure 11:
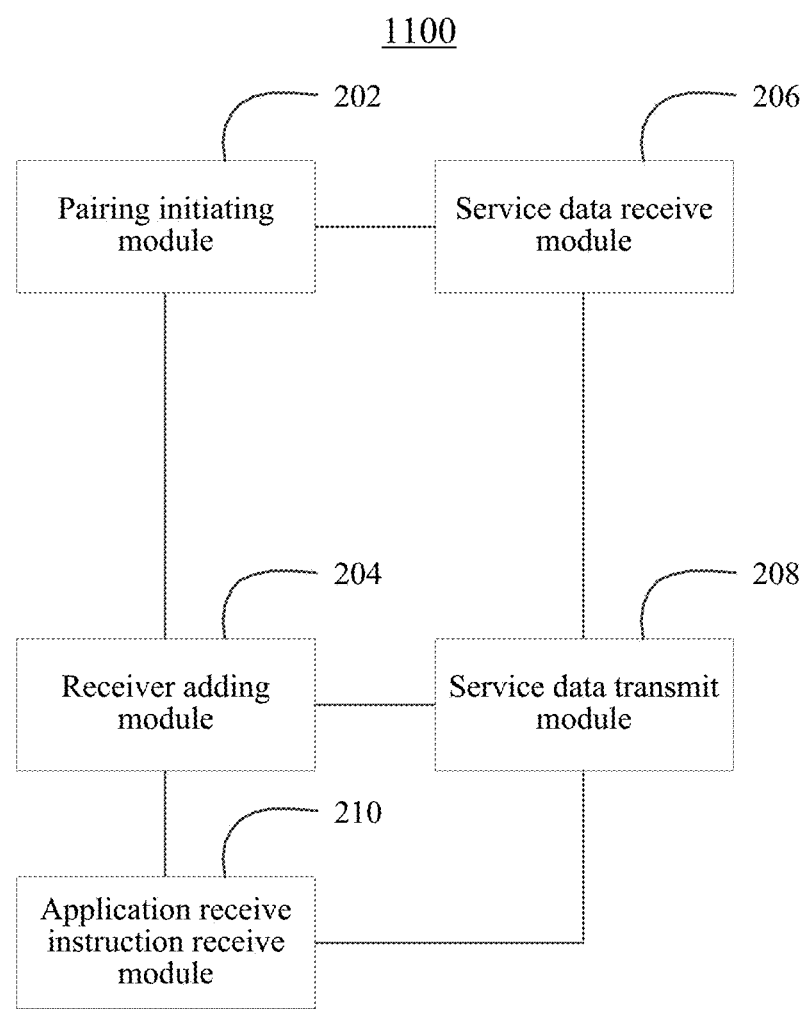
FIG. 11 is a schematic structural diagram of an apparatus for receiving group sent service data according to an embodiment.

To resolve the problem of less convenience in operations caused by the fact that in the social network application of the conventional technology, a user can implement a group sending operation only after performing a relatively large number of friend adding operations and a group creating operation when the user needs to group send service data to a plurality of strangers, in an embodiment, as by the block diagram 1100 shown in FIG. 11, an apparatus for forwarding service data between computing devices corresponding to the foregoing method for forwarding service data between computing devices is particularly provided. The apparatus includes: a pairing initiating module 202, a receiver adding module 204, a service data receive module 206, and a service data transmit module 208.

The pairing initiating module 202 is configured to receive an uploaded pairing flag and acquire a sender account corresponding to the pairing flag.

The receiver adding module 204 is configured to receive a pairing and adding request, acquire a user account carried in the pairing and adding request when the pairing and adding request includes the pairing flag, and use the user account as a receiver account, the pairing flag being broadcast by the computing device corresponding to the sender account to computing devices corresponding to the receiver accounts by means of a short range wireless signal.

The service data receive module 206 is configured to receive a service data group sending request uploaded by the computing device corresponding to the sender account, and acquire service data according to the service data group sending request.

The service data transmit module 208 is configured to send the service data to the computing devices corresponding to the receiver accounts.

In an embodiment, the data type of the service data is numerical. The service data transmit module 208 is configured to perform service numeric transfer between the sender account and the receiver accounts according to the service data, and send prompt information corresponding to the service numeric transfer to the receiver accounts.

In an embodiment, the service data transmit module 208 is further configured to extract a quota parameter corresponding to the service numeric transfer according to the service data group sending request, divide the service data into a set of sub-numerics according to the quota parameter, and extract sub-numerics from the set of sub-numerics for performing service numeric transfer to the receiver accounts.

In an embodiment, as by the block diagram 1100 shown in FIG. 11, the apparatus further includes: an application receive instruction receive module 210, configured to receive application receive instructions uploaded by the computing devices corresponding to the receiver accounts and extract first timestamps.

The service data transmit module 208 is configured to send the service data to the computing devices corresponding to the receiver accounts according to a sequence of the first timestamps.

In an embodiment, the receiver adding module 204 is further configured to acquire a quantity of receivers of the receiver accounts. The service data transmit module 208 is configured to determine whether the quantity of receivers is greater than the quota parameter, and return receive failure prompt information to the receiver accounts if the quantity of receivers is greater than the quota parameter.

In an embodiment, the service data transmit module 208 is configured to determine whether the set of sub-numerics is null, and return receive failure prompt information to the receiver accounts if the set of sub-numerics is null.

In an embodiment, the service data transmit module 208 is configured to: acquire a second timestamp when the service data group sending request is received; determine whether the second timestamp is expired; and acquire a remaining sub-numeric in the set of sub-numerics, return the remaining sub-numeric to the sender account, and send prompt information to the computing device corresponding to the sender account if the second timestamp is expired.

Figure 12:
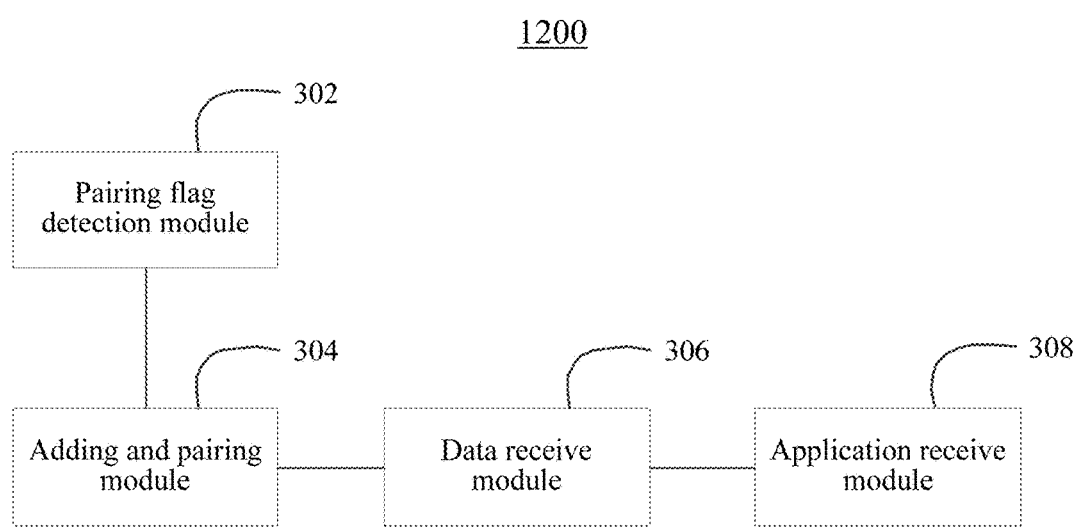
FIG. 12 is a schematic structural diagram of an apparatus for forwarding service data between computing devices according to an embodiment.

To resolve the problem of less convenience in operations caused by the fact that in the social network application of the conventional technology, a user can implement a group sending operation only after performing a relatively large number of friend adding operations and a group creating operation when the user needs to group send service data to a plurality of strangers, in an embodiment, as provided by the block diagram 1200 shown in FIG. 12, an apparatus for receiving group sent service data corresponding to the foregoing method for receiving group sent service data is particularly provided. The apparatus includes: a pairing flag detection module 302, an adding and pairing module 304, and a data receive module 306.

The pairing flag detection module 302 is configured to detect a short range wireless signal and acquire a pairing flag carried in the short range wireless signal.

The adding and pairing module 304 is configured to acquire receiver accounts and upload the pairing flag to a server, the pairing flag carrying the receiver accounts, so that the server searches for a sender account corresponding to the pairing flag and searches for service data uploaded by the sender account.

The data receive module 306 is configured to receive the service data uploaded by the sender account to the server.

In an embodiment, the data type of the service data is numerical. The server performs service numeric transfer between the sender account and the receiver accounts according to the service data. The data receive module 306 is configured to receive prompt information returned by the server and corresponding to the service numeric transfer.

In an embodiment, as provided by the block diagram 1200 shown in FIG. 12, the apparatus further includes an application receive module 308, configured to receive input application receive instructions, and upload the application receive instructions to the server, the application receive instructions carrying timestamps, so that the server extract sub-numerics from the service data according to a sequence of the received timestamps, for performing service numeric transfer between the sender account and the receiver accounts.

By using the service data group sending method and apparatus, when an initiator who sends service data to strangers, that is, users who are not in a social relation chain with the initiator, the initiator can directly broadcast a pairing flag within a short range by means of a short range wireless signal, that is, the initiator can be associated with a plurality of strangers by means of the pairing flag, without sequentially adding the plurality of strangers as friends first. That is, a computing device having a pairing flag the same as that of a computing device of the initiator can receive the service data group sent by the initiator, thereby avoiding the complex steps of friend adding and verification, and improving convenience of operations.

In addition, by using the service data group sending method and apparatus, the user may determine, by means of a server and according to the pairing flag, a user account satisfying an identity of a receiver account and send the service data to the user account as the receiver account, rather than create a group for a plurality of receiver accounts and group send the service data by means of the group. Therefore, the operation of creating a group for group sending by the initiator is also omitted, thereby improving convenience of operations.

Figure 13:
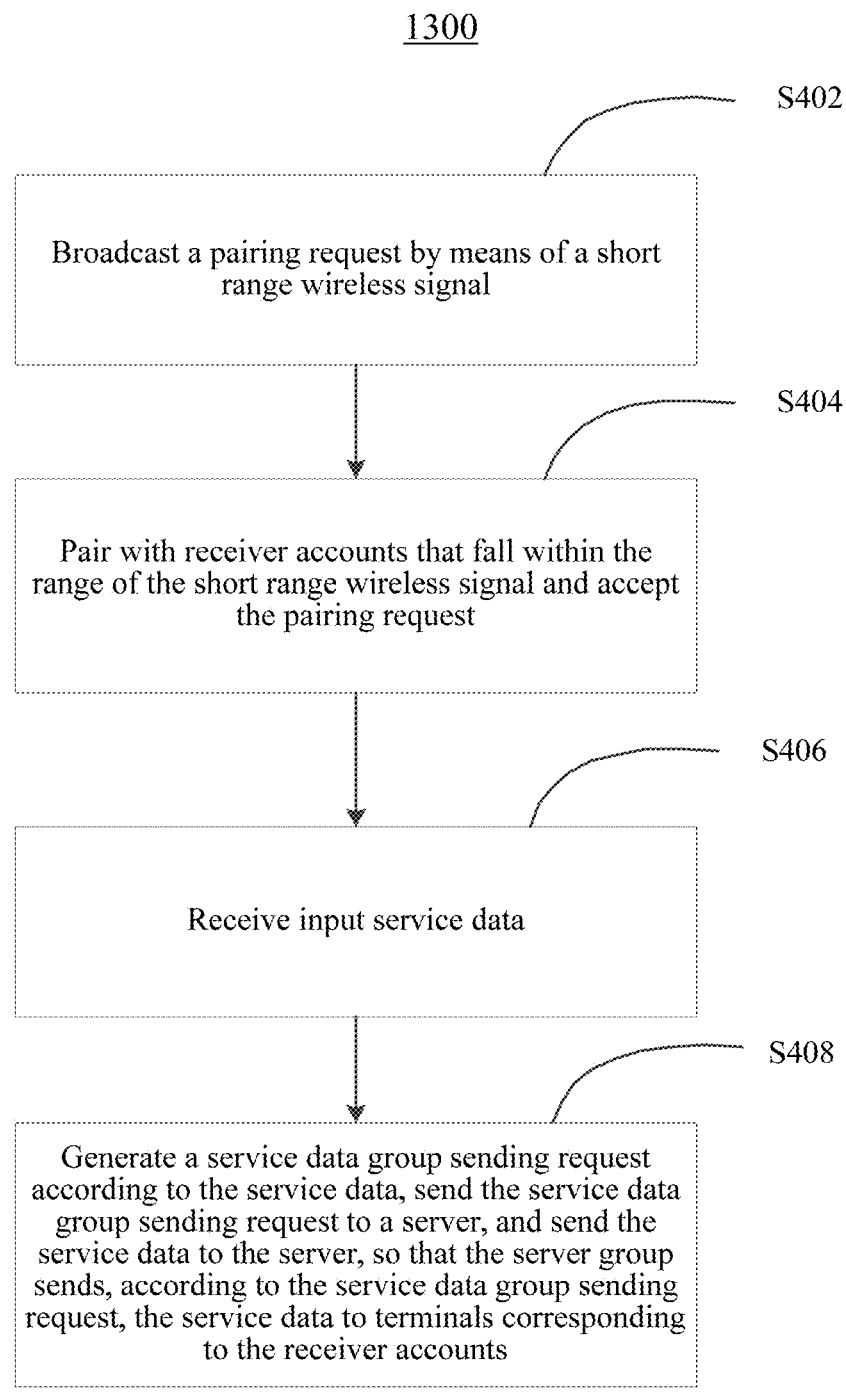
FIG. 13 is a flowchart of a service data group sending method according to another embodiment.

The foregoing describes a method for acquiring receiver accounts that are in different social relation chains and group sending the service data to computing devices corresponding to the receiver accounts by using a pairing flag. However, in addition to the use of a pairing flag, another flag or data marker may also be used for group sending service data to computing devices corresponding to receiver accounts, as long as the flag can help pair with receiver accounts. In an embodiment, the service data group sending method may be run in the computing device 10 of the sender account, as provided by the block diagram 1200 shown in FIG. 13, and the method includes:

Step S402: Broadcast a pairing request by means of a short range wireless signal.

The short range wireless signal may be a wireless signal that is transmitted within tens of meters, such as an NFC signal, a Bluetooth signal, a WiFi signal (a network neighborhood on a wireless local network), or a Zigbee signal. For example, if an NFC chip is mounted on a smart computing device, the smart computing device may broadcast a pairing request to another computing device by means of an NFC signal. Another user may create a connection with the computing device of the sender by means of detecting a short range wireless signal by approaching the computing device to the computing device of the sender, so as to receive the pairing request. The user account of the social network application logged on the computing device may be referred to as a receiver account.

Step S404: Pair with receiver accounts that fall within the range of the short range wireless signal and accept the pairing request.

In the embodiments of the present disclosure, the sender and the receiver may add each other as friends in advance, or may either not add each other as friends. After the computing device corresponding to the sender account sends a pairing request to the computing devices corresponding to the receiver accounts, the computing device corresponding to the sender account receives responses from the computing devices corresponding to the receiver accounts. That is, the computing device corresponding to the sender account needs to first determine which computing device or which computing devices to distribute the service data.

Step S406: Receive input service data.

A service data input interface may be presented for an initiator to enter service data. The input service data may be in a plurality of data formats, for example, in types of a file, a picture, a numeric, or the like.

For example, in a standby embodiment, if an initiator wants to group send a file in a web disk to a plurality of other users, the initiator may enter a network storage path of the file in the web disk.

In another standby embodiment, if an initiator wants to group send a photo stored locally to a plurality of other users, the service data input interface may provide a photo option box and the initiator may first select a local phone file on the service data input interface as a service data input, then upload the photo file to a network storage location, such as a server or a third party storage server, obtain a returned network storage path of the photo file, and then use the network storage address as a service data input.

In addition, in a situation of mobile payment, the service data may also be of a numeric type, for example, a payment amount or a transfer amount. The service data is numeric data capable of being transferred between a sender account and a receiver account.

It should be noted that the sequence between step S406 and step S402 or step S404 does not need to be strictly defined. The sender may first broadcast the pairing request by means of the short range wireless signal, pair with the receiver accounts that fall within the range of the short range wireless signal and accept the pairing request, find the computing devices corresponding to the receiver accounts, and then present the service data input interface for inputting the service data. The sender may also first input the service data in the presented service data input interface, and then broadcast the pairing request by means of the short range wireless signal, pair with the receiver accounts that fall within the range of the short range wireless signal and accept the pairing request, and find the computing devices of the receiver accounts. The two steps are not conflict with each other.

Step S408: Generate a service data group sending request according to the service data, send the service data group sending request to a server, and send the service data to the server, so that the server group sends, according to the service data group sending request, the service data to computing devices corresponding to the receiver accounts.

In the embodiment, by using the service data group sending method, when an initiator who sends service data to strangers, that is, users who are not in a social relation chain with the initiator, the initiator can directly communicate with a plurality of strangers by means of a short range wireless signal, to further pair with a plurality of strangers who accepts a pairing request, without sequentially adding the plurality of strangers as friends first, thereby avoiding the complex steps of friend adding and verification, and improving convenience of operations.

In addition, by using the service data group sending method and apparatus, the user may determine, by means of a short range wireless signal or a server, a user account satisfying an identity of a receiver account and send the service data to the user account as the receiver account, rather than create a group for a plurality of receiver accounts and group send the service data by means of the group. Therefore, the operation of creating a group for group sending by the initiator is omitted, thereby improving convenience of operations.

In an embodiment, the step of broadcasting a pairing request by means of a short range wireless signal may include:

generating a pairing flag, and broadcasting the pairing flag by means of the short range wireless signal.

The step of pairing with receiver accounts that fall within the range of the short range wireless signal and accept the pairing request may include:

uploading the pairing flag to the server, and receiving receiver accounts returned by the server and corresponding to the pairing flag.

Figure 14:
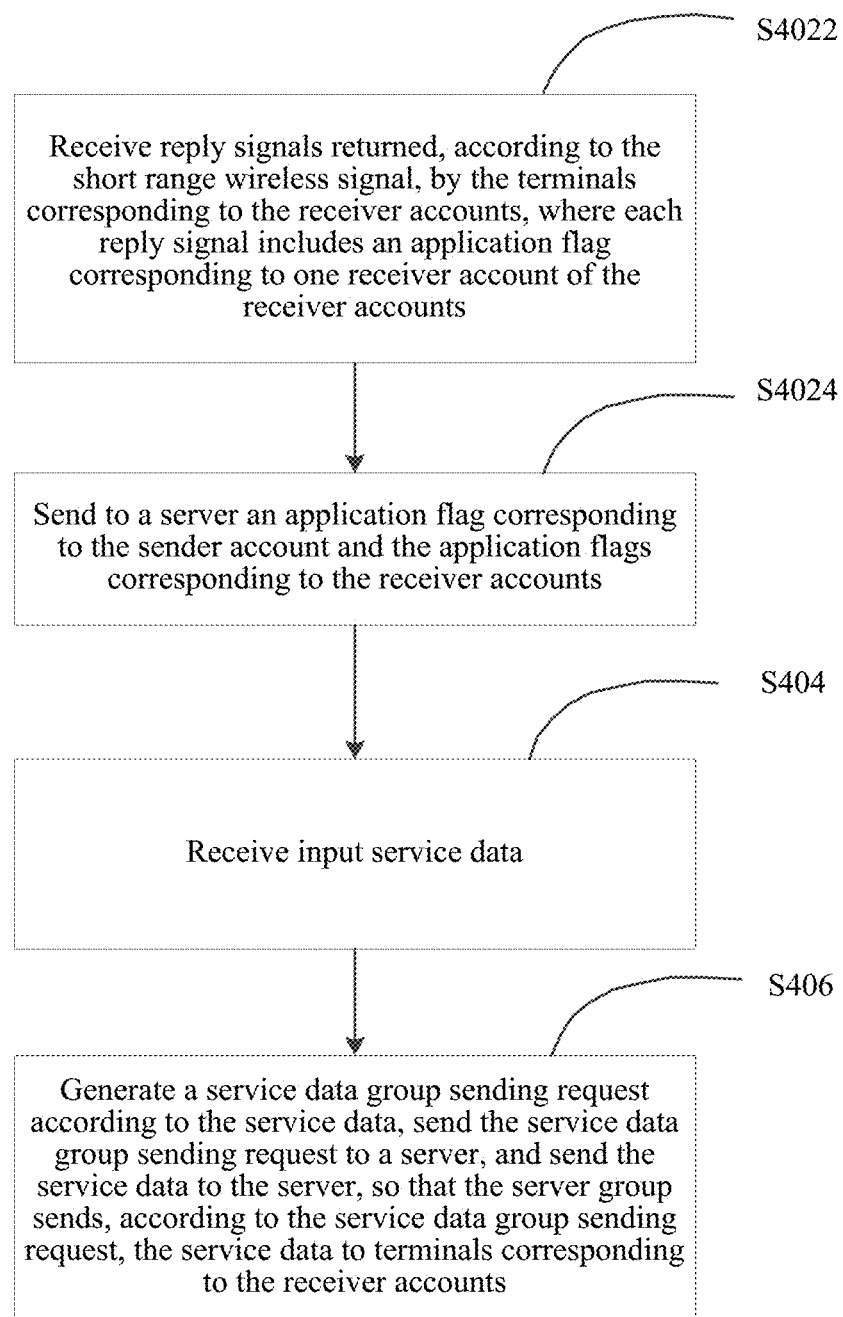
FIG. 14 is a flowchart of a service data group sending method according to still another embodiment.

In another embodiment, the step of pairing with receiver accounts that fall within the range of the short range wireless signal and accept the pairing request, as shown in FIG. 14, may include:

S4022: Receive reply signals returned, according to the short range wireless signal, by the computing devices corresponding to the receiver accounts, where each reply signal includes an application flag corresponding to one receiver account of the receiver accounts.

The application flags corresponding to the receiver accounts may be unique flags of various types, as long as the computing devices corresponding to the receiver accounts can be uniquely distinguished. For example, the application flags corresponding to the receiver accounts may be an international mobile equipment identity (IMEI) code. There may be a plurality of methods for acquiring, by the computing device corresponding to the sender account, the application flags corresponding to the receiver accounts. For example, the sender who operates the computing device of the sender account enters the application flags corresponding to the receiver accounts, or the computing device corresponding to the sender account obtains the application flags corresponding to the receiver accounts by searching in advance.

In this embodiment, the computing device corresponding to the sender account directly acquires the application flags corresponding to the receiver accounts that accept the pairing request, rather than use a server, for completing pairing. Therefore, the step of acquiring receiver accounts from a server is omitted and the efficiency is high.

After the step of receiving reply signals returned, according to the short range wireless signal, by the computing devices corresponding to the receiver accounts, the method may further include:

S4024: Send to a server an application flag corresponding to the sender account and the application flags corresponding to the receiver accounts.

In the embodiments of the present disclosure, after the computing device corresponding to the sender account acquires the application flags corresponding to the receiver accounts, the computing device corresponding to the sender account sends to the server the application flag corresponding to the sender account and the application flags corresponding to the receiver accounts through a currently connected network. The server may record information of all the application flags.

In an embodiment, after the step of sending an application flag corresponding to the sender account and the application flags corresponding to the receiver accounts to a server, the method may further include:

entering a service data distribution interface and presenting on the service data distribution interface the service data that is acquired by the computing devices corresponding to the receiver accounts.

A service data distribution interface may be created in the computing device corresponding to the sender account. The service data distribution interface may be a distribution interface of a social product. When the computing device corresponding to the sender account needs to distribute service data to the computing devices corresponding to the receiver accounts, the computing device corresponding to the sender account first enters the service data distribution interface, presents on the service data distribution interface the service data that can be acquired by the computing devices corresponding to the receiver accounts. A user may simply and conveniently observe, by means of the service data distribution interface of the computing device corresponding to the sender account, a quantity of pieces of the service data to be distributed and a quantity of currently remaining pieces of service data.

In the foregoing situation, the step of sending the service data to a server may include:

sending the service data presented on the service data distribution interface to the server.

After the computing device corresponding to the sender account presents the service data on the service data distribution interface, the computing device corresponding to the sender account sends the service data presented on the service data distribution interface to the server, so as to ensure consistency between the quantity of pieces of the service data presented on the service data distribution interface and the quantity of pieces of the service data sent to the server.

As can be learned from the description of the present disclosure through the foregoing embodiments, the computing device corresponding to the sender account first acquires the application flags corresponding to the receiver accounts, then the computing device corresponding to the sender account sends to the server the application flag corresponding to the sender account and the application flags corresponding to the receiver accounts, and subsequently, the computing device corresponding to the sender account sends the service data that can be acquired by the computing devices corresponding to the receiver accounts to the server, so that the server simultaneously sends the service data to the computing devices corresponding to the receiver accounts. In the embodiments of the present disclosure, the service data provided by the computing device corresponding to the sender account to the computing devices corresponding to the receiver accounts may be acquired by the computing devices corresponding to the receiver accounts, the sender can distribute the service data without adding the receivers as friends, or creating a group for the computing device corresponding to the sender account in advance, and therefore the existing service data processing process can be simplified and the efficiency of service data acquisition between users can be improved.

Figure 15:
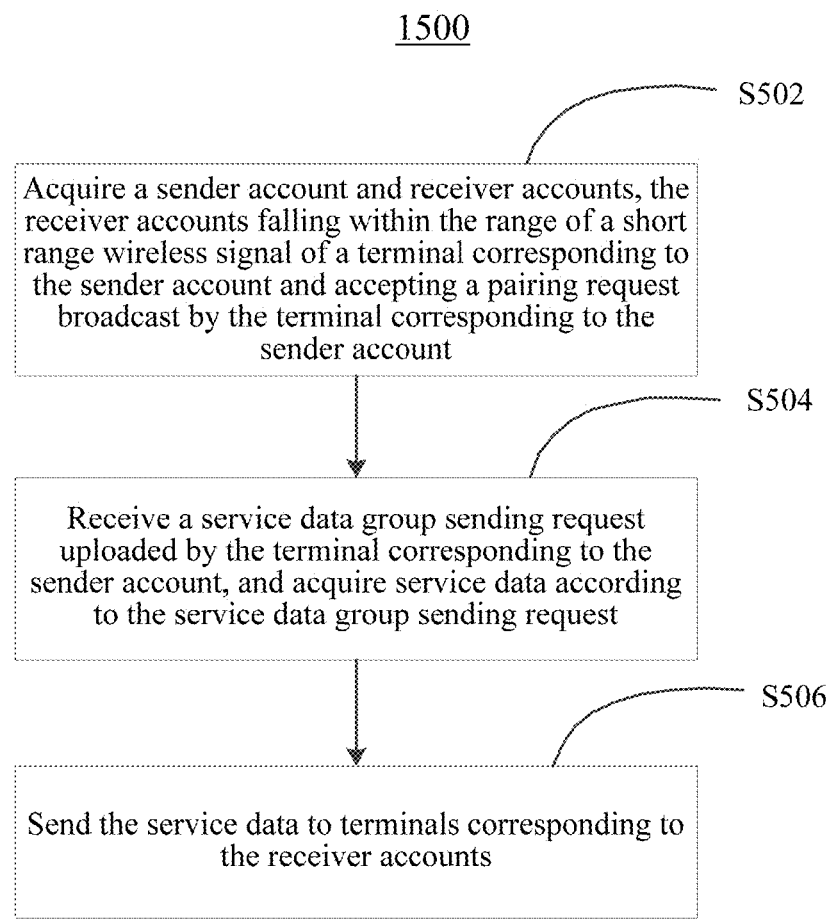
FIG. 15 is a flowchart of a method for receiving group sent service data according to another embodiment.

Correspondingly, the method for forwarding service data between computing devices performed by a server may be provided by the flow chart 1500 shown in FIG. 15. The method includes:

Step S502: Acquire a sender account and receiver accounts, the receiver accounts falling within the range of a short range wireless signal of a computing device corresponding to the sender account and accepting a pairing request broadcast by the computing device corresponding to the sender account.

Step S504: Receive a service data group sending request uploaded by the computing device corresponding to the sender account, and acquire service data according to the service data group sending request.

Step S506: Send the service data to computing devices corresponding to the receiver accounts.

In an embodiment, the step of acquiring a sender account and receiver accounts may include:

receiving an uploaded pairing flag, and acquiring a sender account corresponding to the pairing flag; and receiving a pairing and adding request, acquiring a user account carried in the pairing and adding request when the pairing and adding request includes the pairing flag, and using the user account as a receiver account, the pairing flag being broadcast by a computing device corresponding to the sender account to computing devices corresponding to the receiver accounts by means of a short range wireless signal.

Figure 16:
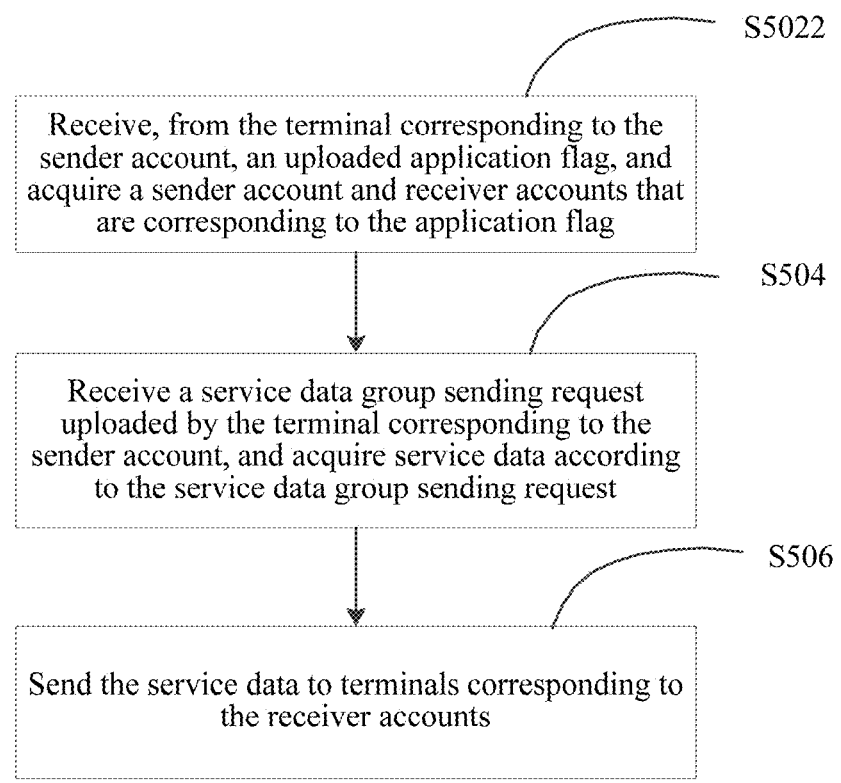
FIG. 16 is a flowchart of a method for receiving group sent service data according to still another embodiment.

In an embodiment, the step of acquiring a sender account and receiver accounts, as provided by the block diagram 1600 shown in FIG. 16, may include:

Step S5022: Receive, from the computing device corresponding to the sender account, an uploaded application flag, and acquire a sender account and receiver accounts that are corresponding to the application flag.

In an embodiment, in a situation in which the service data group sending request includes a quota parameter N of a service numeric, and the service data is divided into a set of sub-numerics according to the quota parameter, the method may further include:

simultaneously sending the quota parameter N to each computing device of the computing devices corresponding to the receiver accounts; and extracting sub-numerics from the set of sub-numerics for performing service numeric transfer to the receiver accounts;

modifying, if a service data acquisition request sent by a first computing device of the computing devices corresponding to the receiver accounts is received, the quota parameter N to be (N−1) according to the service data acquisition request, and sending a service data acquisition response to the first computing device; and sending the quota parameter (N−1) to each computing device of the computing devices corresponding to the receiver accounts.

After the server sends N pieces of service data to each computing device of the computing devices corresponding to the receiver accounts, the computing device corresponding to each receiver account may learn about that the quantity of pieces of service data distributed by the computing device corresponding to the sender account is N. If a computing device corresponding to a receiver account desires to obtain one piece of service data of the N pieces of service data, the computing device corresponding to the receiver account sends to the server a service data acquisition request for acquiring one piece of service data from the N pieces of service data, and the server may receive the service data acquisition request sent by the computing device corresponding to the receiver account. For example, a computing device corresponding to a first receiver account of the computing devices corresponding to the receiver accounts sends to the server a service data acquisition request. The server may receive the service data acquisition request sent by the computing device corresponding to the first receiver account. In a situation in which the server receives the service data acquisition request sent by the computing device corresponding to the first receiver account of the computing devices corresponding to the receiver accounts, the server modifies, according to the service data acquisition request, the service data N to be the service data (N−1) and sends a service data acquisition response to the computing device corresponding to the first receiver account. The service data acquisition response is used for indicating, by the server, that the computing device corresponding to the receiver account has successfully acquired one piece of service data. The server modifies the quantity of pieces of service data from N to be (N−1). Along with successful acquisition of service data by the computing device corresponding to the first receiver account, the quantity of pieces of service data may reduce. Moreover, all of the computing devices corresponding to the receiver accounts may request to the server for acquiring the service data. The quantity of pieces of service data may continuously reduce until the quantity of pieces of service data is zero.

In this embodiment, by monitoring the quantity of pieces of the service data, the group sending operation can be ended in time when all of the pieces of the service data are distributed (that is, the quantity of the pieces of the service data is zero), thereby saving system resources.

In an embodiment, after performing the step of sending the quota parameter (N−1) to each computing device of the computing devices corresponding to the receiver accounts, the method may further include:

determining whether the quota parameter (N−1) is greater than 0 if a service data acquisition request sent by a first computing device or a second computing device of the computing devices corresponding to the receiver accounts is continuously received;

modifying the quota parameter (N−1) to be the quota parameter (N−2), sending a service data acquisition response to the first computing device or the second computing device, and sending the quota parameter (N−2) to each computing device of the computing devices corresponding to the receiver accounts if the quota parameter (N−1) is greater than 0; and sending a service data distribution completed prompt instruction to each computing device of the computing devices corresponding to the receiver accounts if the quota parameter (N−1) is equal to 0.

The server receives a service data acquisition request sent by a computing device corresponding to a first receiver account, and modifies, according to one piece of service data acquired by the computing device corresponding to the first receiver account, the quantity of pieces of service data from N to be (N−1), and each computing device of the computing devices corresponding to the receiver accounts modifies the N pieces of service data to be received from the server to be (N−1) pieces of service data. At this time, the quantity of pieces of service data displayed on the computing device corresponding to the first receiver account is (N−1). If (N−1) is not 0, the computing device corresponding to the first receiver account may continuously send to the server a service data acquisition request for acquiring one piece of service data from the (N−1) pieces of service data. Certainly, another computing device (for example, a computing device corresponding to a second receiver) of the computing devices corresponding to the receiver accounts may also send to the server a service data acquisition request for acquiring one piece of service data from the (N−1) pieces of service data. After the server receives the service data acquisition request for acquiring one piece of service data from the (N−1) pieces of service data sent by the computing device corresponding to the first receiver account or the computing device corresponding to the second receiver account, the server determines whether (N−1) is greater than 0. That is, the server needs to check whether the N pieces of service data distributed by the computing device corresponding to the sender account are all acquired. If (N−1) is greater than 0, it indicates that there is still a piece of service data and not all the N pieces of service data distributed by the computing device corresponding to the sender account are acquired. The server modifies the service data (N−1) to be the service data (N−2) and sends a service data acquisition response to the computing device corresponding to the first receiver account or the computing device corresponding to the second receiver account. The server sends the (N−2) pieces of service data to each computing device of the computing devices corresponding to the receiver accounts. That is, each computing device of the computing devices corresponding to the receiver accounts may learn about that the quantity of pieces of service data is (N−2).

It should be noted that the computing device corresponding to the first receiver account may continuously send a service data acquisition request to the server after the computing device corresponding to the first receiver account acquires one piece of service data, as long as the quantity of pieces of service data is not 0. The computing device corresponding to the first receiver account may further acquire one piece of service data. In the existing service data processing process, the service data receiving process ends after one user receives one piece of service data delivered by another user, and the user is no longer able to continuously receive service data from the another user, and can only wait for the another user to redeliver service data. For example, in an actual application scenario in the existing technology, one user can only grab one red packet. If a user has grabbed one red packet, the user can no longer grab a red packet again even if there is still a red packet that is not grabbed in the group. The user is not able to acquire service data multiple times. In the embodiments of the present disclosure, for example, for a computing device corresponding to one same receiver account (a computing device corresponding to the first receiver account), the computing device corresponding to the receiver account may further acquire the service data multiple times, as long as the quantity of pieces of the service data is not 0, thereby satisfying a user's demand of acquiring service data multiple times.

In some embodiments of the present disclosure, the service data acquisition request sent by the computing device corresponding to the first receiver account and received by the server is a service data acquisition request that arrives first among the service data acquisition requests respectively sent by the computing devices corresponding to the receiver accounts. That is, the server performs modification on the N pieces of service data by polling according to a chronological order of arrivals of the service data acquisition requests to the server, and also needs to perform sending of the modified quantity of pieces of service data by polling according to the chronological order of arrivals of the service data acquisition requests to the server.

Figure 17:
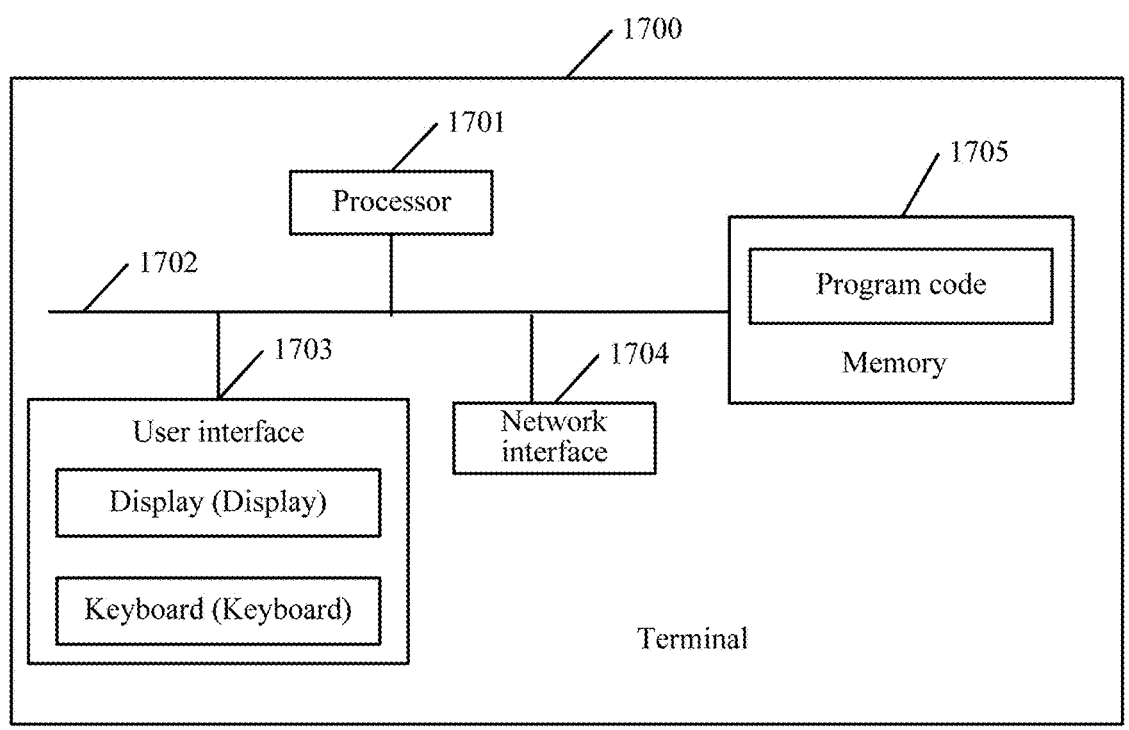
FIG. 17 is a schematic structural diagram of a service data group sending apparatus according to another embodiment.

In an embodiment, as shown in FIG. 17, a computing device corresponding to the foregoing service data group sending method is provided. A computing device 1700 may at least include: at least one processor 1701, for example, a CPU, at least one network interface 1704, a user interface 1703, a memory 1705, and at least one communication bus 1702. The communication bus 1702 is configured to implement connection and communication between the components. The user interface 1703 may include a display, or a keyboard. Optionally, the user interface 1703 may further include a standard wired interface, or a wireless interface. Optionally, the network interface 1704 may include a standard wired interface or a wireless interface (for example, a WiFi interface). The memory 1705 may be a high-speed RAM, or may also be a non-volatile memory, for example, at least one disk memory. Optionally, the memory 1705 may also be a storage device located at a position far away from the processor 1701.

In the computing device 1700 shown in FIG. 17, the user interface 1703 is mainly configured to provide an interface for input by a user and acquire data input by a user. The network interface 1704 is mainly configured to perform data transmission with a server. The processor 1701 may be configured to execute a computer readable program code stored in the memory 1705, and specifically perform the following operations:

broadcasting a pairing request by means of a short range wireless signal;

pairing with receiver accounts that fall within the range of the short range wireless signal and accept the pairing request;

receiving input service data; and generating a service data group sending request according to the service data, sending the service data group sending request to a server, and sending the service data to the server, so that the server group sends, according to the service data group sending request, the service data to computing devices corresponding to the receiver accounts.

In an embodiment, the processor 1701 being configured to execute the computer readable program code, so as to broadcast a pairing request by means of a short range wireless signal includes:

generating a pairing flag, and broadcasting the pairing flag by means of the short range wireless signal.

The processor being configured to execute the computer readable program code, so as to pair with receiver accounts that fall within the range of the short range wireless signal and accept the pairing request includes:

uploading the pairing flag to the server, and receiving receiver accounts returned by the server and corresponding to the pairing flag.

In another embodiment, the processor 1701 being configured to execute the computer readable program code, so as to pair with receiver accounts that fall within the range of the short range wireless signal and accept the pairing request includes:

receiving reply signals returned, according to the short range wireless signal, by the computing devices corresponding to the receiver accounts, where each reply signal includes an application flag corresponding to one receiver account of the receiver accounts.

In an embodiment, after executing the computer readable program code, so as to receive a reply signal returned, according to the short range wireless signal, by each computing device of the computing devices corresponding to the receiver accounts, the processor 1701 further performs the following operation:

sending to a server an application flag corresponding to the sender account and the application flags corresponding to the receiver accounts.

In an embodiment, the processor 1701 being configured to execute the computer readable program code, so as to receive input service data includes:

acquiring a network storage path of the service data.

The processor 1701 being configured to execute the computer readable program code, so as to generate a service data group sending request according to the service data and send the service data group sending request to a server includes:

generating a service data group sending request according to the network storage path of the service data and sending the service data group sending request to the server, so that the server group sends the network storage path to the computing devices corresponding to the receiver accounts, and the computing devices corresponding to the receiver accounts download the service data according to the network storage path.

In an embodiment, the processor 1701 being configured to execute the computer readable program code, so as to upload the pairing flag to the server includes:

acquiring a sender account and uploading the sender account.

In an embodiment, the data type of the service data is numerical. The processor 1701 being configured to execute the computer readable program code, so as to receive input service data includes:

receiving input service data that is corresponding to the sender account, so that the server performs service numeric transfer between the sender account and the receiver accounts according to the service data.

In an embodiment, the processor 1701 being configured to execute the computer readable program code, so as to receive input service data that is corresponding to the sender account includes:

receiving an input quota parameter.

The processor 1701 being configured to execute the computer readable program code, so as to generate a service data group sending request according to the service data and send the service data group sending request to a server includes:

adding the quota parameter to the service data group sending request, so that the server divides the service data into a set of sub-numerics according to the quota parameter and extracts sub-numerics from the set of sub-numerics for the receiver accounts for performing service numeric transfer.

In an embodiment, after executing the computer readable program code, so as to receive input service data that is corresponding to the sender account, the processor 1701 further performs the following operation:

presenting an identity verification window, acquiring, by means of the identity verification window, input identity verification information corresponding to the sender account, sending the identity verification information to the server for verification, and generating a service data group sending request according to the service data and sending the service data group sending request to a server when a verification successful message returned by the server is received.

In an embodiment, after executing the computer readable program code, so as to pair with receiver accounts that fall within the range of the short range wireless signal and accept the pairing request, the processor 1701 further performs the following operation:

presenting the receiver accounts on the display interface.

After executing the computer readable program code, so as to generate a service data group sending request according to the service data and send the service data group sending request to a server, the processor 1701 further performs the following operation:

receiving a receiver account that is returned by the server and of which the receive state is received, and presenting on the display interface a prompt effect for the received receiver account.

In an embodiment, after executing the computer readable program code, so as to present the receiver accounts on the display interface, the processor 1701 further performs the following operations:

receiving a relation chain adding instruction by means of the display interface, and acquiring a receiver account that is corresponding to the relation chain adding instruction and selected on the display interface; and generating a relation chain adding request according to the selected receiver account and sending the relation chain adding request to the server, so that the server creates a relation chain mapping between the sender account and the selected receiver account.

In an embodiment, after executing the computer readable program code, so as to send to the server an application flag corresponding to the sender account and the application flags corresponding to the receiver accounts, the processor 1701 further performs the following operation:

entering a service data distribution interface and presenting on the service data distribution interface the service data that is acquired by the computing devices corresponding to the receiver accounts.

The processor 1701 being configured to execute the computer readable program code, so as to send the service data to the server includes:

sending the service data presented on the service data distribution interface to the server.

Figure 18:
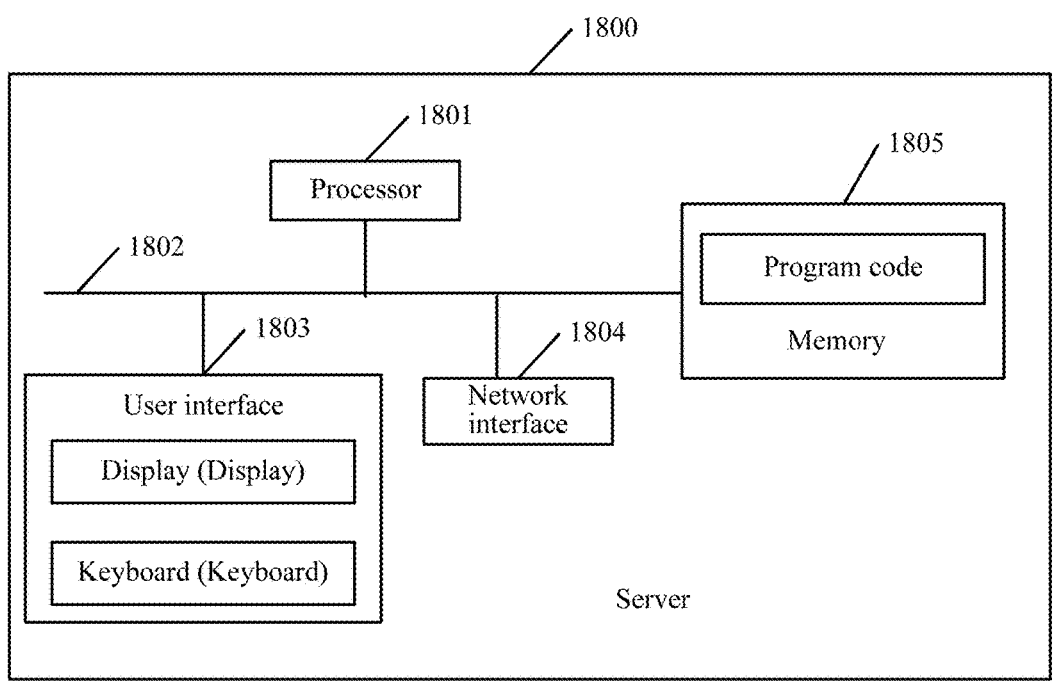
FIG. 18 is a schematic structural diagram of an apparatus for forwarding service data between computing devices according to another embodiment.

In an embodiment, as shown in FIG. 18, a server for forwarding service data between computing devices corresponding to the foregoing method for forwarding service data between computing devices is particularly provided. A server 1800 may at least include: at least one processor 1801, for example, a CPU, at least one network interface 1804, a user interface 1803, a memory 1805, and at least one communication bus 1802. The communication bus 1802 is configured to implement connection and communication between the components. The user interface 1803 may include a display, or a keyboard. Optionally, the user interface 1803 may further include a standard wired interface, or a wireless interface. Optionally, the network interface 1804 may include a standard wired interface or a wireless interface (for example, a WiFi interface). The memory 1805 may be a high-speed RAM, or may also be a non-volatile memory, for example, at least one disk memory. Optionally, the memory 1805 may also be a storage device located at a position far away from the processor 1801.

In the server 1800 shown in FIG. 18, the user interface 1803 is mainly configured to provide an interface for input by a user and acquire data input by a user. The network interface 1804 is mainly configured to perform data transmission with a server. The processor 1801 may be configured to execute a computer readable program code stored in the memory 1805, and specifically perform the following operations:

acquiring a sender account and receiver accounts, the receiver accounts falling within the range of a short range wireless signal of a computing device corresponding to the sender account and accepting a pairing request broadcast by the computing device corresponding to the sender account;

receiving a service data group sending request uploaded by the computing device corresponding to the sender account, and acquiring service data according to the service data group sending request; and sending the service data to computing devices corresponding to the receiver accounts.

In an embodiment, the processor 1801 being configured to execute the computer readable program code, so as to acquire a sender account and receiver accounts includes:

receiving an uploaded pairing flag, and acquiring a sender account corresponding to the pairing flag; and receiving a pairing and adding request, acquiring a user account carried in the pairing and adding request when the pairing and adding request includes the pairing flag, and using the user account as a receiver account, the pairing flag being broadcast by a computing device corresponding to the sender account to computing devices corresponding to the receiver accounts by means of a short range wireless signal.

In an embodiment, the processor 1801 being configured to execute the computer readable program code, so as to acquire a sender account and receiver accounts includes:

receiving, from the computing device corresponding to the sender account, an uploaded application flag, and acquiring a sender account and receiver accounts that are corresponding to the application flag.

In an embodiment, the data type of the service data is numerical. The processor 1801 being configured to execute the computer readable program code, so as to send the service data to the computing devices corresponding to the receiver accounts includes:

performing service numeric transfer between the sender account and the receiver accounts according to the service data, and sending prompt information corresponding to the service numeric transfer to the receiver accounts.

In an embodiment, after executing the computer readable program code, so as to receive a service data group sending request uploaded by the computing device corresponding to the sender account, the processor 1801 further performs the following operations:

extracting a quota parameter corresponding to the service numeric transfer according to the service data group sending request; and dividing the service data into a set of sub-numerics according to the quota parameter.

The processor 1801 being configured to execute the computer readable program code, so as to perform service numeric transfer between the sender account and the receiver accounts according to the service data includes:

extracting sub-numerics from the set of sub-numerics for performing service numeric transfer to the receiver accounts.

In an embodiment, before executing the computer readable program code, so as to extract sub-numerics from the set of sub-numerics for performing service numeric transfer to the receiver accounts, the processor 1801 further performs the following operations:

receiving application receive instructions uploaded by the computing devices corresponding to the receiver accounts and extracting first timestamps.

The processor 1801 being configured to execute the computer readable program code, so as to extract sub-numerics from the set of sub-numerics for performing service numeric transfer to the receiver accounts includes:

sequentially sending the service data to the computing devices corresponding to the receiver accounts according to the sequence of the first timestamps.

In an embodiment, the processor 1801 being configured to execute the computer readable program code, so as to acquire a sender account and receiver accounts includes:

acquiring a quantity of receivers of the receiver accounts.

The processor 1801 being configured to execute the computer readable program code, so as to extract sub-numerics from the set of sub-numerics for performing service numeric transfer to the receiver accounts includes:

determining whether the quantity of receivers is greater than the quota parameter, and returning receive failure prompt information to the receiver accounts if the quantity of receivers is greater than the quota parameter.

In an embodiment, the processor 1801 being configured to execute the computer readable program code, so as to send the service data to the computing devices corresponding to the receiver accounts includes:

determining whether the set of sub-numerics is null, and returning receive failure prompt information to the receiver accounts if the set of sub-numerics is null.

In an embodiment, the processor 1801 being configured to execute the computer readable program code, so as to receive a service data group sending request uploaded by the computing device corresponding to the sender account includes:

acquiring a second timestamp of receiving the service data group sending request.

The processor 1801 is configured to execute the computer readable program code, so as to perform the following operations:

determining whether the second timestamp is expired; and acquiring a remaining sub-numeric in the set of sub-numerics, returning the remaining sub-numeric to the sender account, and sending prompt information to the computing device corresponding to the sender account if the second timestamp is expired.

In an embodiment, the quota parameter is N. The processor 1801 is configured to execute the computer readable program code, so as to divide the service data into a set of sub-numerics according to the quota parameter, and then perform the following operation:

simultaneously sending the quota parameter N to each computing device of the computing devices corresponding to the receiver accounts.

The processor 1801 is configured to execute the computer readable program code, so as to extract sub-numerics from the set of sub-numerics for performing service numeric transfer to the receiver accounts, and then perform the following operations:

modifying, if a service data acquisition request sent by a first computing device of the computing devices corresponding to the receiver accounts is received, the quota parameter N to be (N−1) according to the service data acquisition request, and sending a service data acquisition response to the first computing device; and sending the quota parameter (N−1) to each computing device of the computing devices corresponding to the receiver accounts.

In an embodiment, the processor 1801 is configured to execute the computer readable program code, so as to send the quota parameter (N−1) to each computing device of the computing devices corresponding to the receiver accounts, and then perform the following operations:

determining whether the quota parameter (N−1) is greater than 0 if a service data acquisition request sent by a first computing device or a second computing device of the computing devices corresponding to the receiver accounts is continuously received;

modifying the quota parameter (N−1) to be the quota parameter (N−2), sending a service data acquisition response to the first computing device or the second computing device, and sending the quota parameter (N−2) to each computing device of the computing devices corresponding to the receiver accounts if the quota parameter (N−1) is greater than 0; and sending a service data distribution completed prompt instruction to each computing device of the computing devices corresponding to the receiver accounts if the quota parameter (N−1) is equal to 0.

In an embodiment, the received service data acquisition request sent by the first computing device is a service data acquisition request that arrives first among the service data acquisition requests respectively sent by the computing devices corresponding to the receiver accounts.

The above descriptions are merely preferred embodiments of the present disclosure, and certainly cannot be used to limit the scope of the claims of the present disclosure. Equivalent changes made according to the claims of the present disclosure still fall within the scope of the present disclosure.

What is claimed is:

1. A method for group sending service data by a sender computing device including a processor and memory, the method comprising:

broadcasting a pairing request according to a short range wireless signal;

pairing with accepted computing devices falling within a range of the short range wireless signal according to an acceptance of the pairing request, wherein acceptance of the pairing request comprises receiving reply signals returned by the accepted computing devices according to the short range wireless signal, wherein the accepted computing devices are related to receiver accounts, and wherein each reply signal comprises an application flag corresponding to one receiver account from the receiver accounts;

acquiring a network storage path of the service data, wherein a data type of the service data is numerical;

generating a service data group sending request, the service data group sending request including the network storage path of the service data;

sending the service data group sending request to a server, wherein the server is configured to send the network storage path of the service data to the accepted computing devices, and wherein the accepted computing devices are configured to download the service data according to the network storage path of the service data;

receiving service data corresponding to a sender account, so that the server performs service numeric transfer between the sender account and the receiver accounts according to the service data.

2. The method according to claim 1, wherein broadcasting the pairing request comprises:
generating a pairing flag, and broadcasting the pairing flag according to the short range wireless signal; and
wherein pairing with the accepted computing devices falling within the range of the short range wireless signal according to an acceptance of the pairing request comprises:
uploading the pairing flag to the server; and
receiving receiver accounts returned by the server and corresponding to the pairing flag.

3. The method according to claim 2, wherein uploading the pairing flag to the server further comprises:
acquiring a sender account and uploading the sender account.

4. The method according to claim 1, wherein after receiving the reply signals returned, the method further comprising:
sending, to the server, an application flag corresponding to a sender account, the application flag corresponding to the receiver accounts.

5. The method according to claim 4, wherein after sending, to the server, the application flag, the method further comprises:
entering a service data distribution interface, and presenting on the service data distribution interface the service data that is obtained by the accepted computing devices; and
wherein sending the service data to the server comprises:
sending the service data presented on the service data distribution interface to the server.

6. The method according to claim 1, wherein receiving service data further comprises:
receiving an input quota parameter; and
wherein generating the service data group sending request according to the service data and sending the service data group sending request to the server further comprises:
adding the quota parameter to the service data group sending request, so that the server divides the service data into a set of sub-numerics according to the quota parameter, and extracting sub-numerics from the set of sub-numerics for the receiver accounts for performing service numeric transfer.

7. The method according to claim 1, wherein after receiving the service data, the method further comprises:
presenting an identity verification window;
acquiring, according to the identity verification window, input identity verification information corresponding to the sender account;
sending the identity verification information to the server for verification; and
when a verification successful message returned by the server is received, generating the service data group sending request according to the service data and sending the service data group sending request to the server.

8. The method according to claim 1, wherein after pairing with the accepted computing devices falling within the range of the short range wireless signal according to an acceptance of the pairing request, the method further comprises:
presenting the receiver accounts on a display interface; and
wherein after generating the service data group sending request according to the service data and sending the service data group sending request to a server, the method further comprises:
receiving a receiver account that is returned by the server and of which a receive state is received; and
presenting on the display interface a prompt effect for the received receiver account.

9. The method according to claim 8, wherein after presenting the receiver accounts on the display interface, the method further comprises:
receiving a relation chain adding instruction on the display interface;
acquiring a selected receiver account corresponding to the relation chain adding instruction and selected on the display interface; and
generating a relation chain adding request according to the selected receiver account and sending the relation chain adding request to the server, so that the server creates a relation chain mapping between the sender account and the selected receiver account.

10. A computing device, comprising:
a memory, configured to store computer readable program code; and
a processor configured to execute the computer readable program code to:
broadcast a pairing request according to a short range wireless signal;
pair with accepted computing devices falling within the range of the short range wireless signal according to an acceptance of the pairing request, wherein acceptance of the paring request comprises receiving reply signals returned by the accepted computing devices according to the short range wireless signal, wherein the accepted computing devices are related to receiver accounts, and wherein each reply signal comprises an application flag corresponding to one receiver account from the receiver accounts;
acquire a network storage path of service data, wherein a data type of the service data is numerical;
generate a service data group sending request, the service data group sending request including the network storage path of the service data;
send the service data group sending request to a server, wherein the server is configured to send the network storage path of the service data to the accepted computing devices, and wherein the accepted computing devices are configured to download the service data according to the network storage path of the service data; and
receive service data corresponding to a sender account, so that the server performs service numeric transfer between the sender account and the receiver accounts according to the service data.

11. The computing device according to claim 10, wherein the processor is configured to execute the computer readable program code to broadcast the pairing request by:
generating a pairing flag, and broadcasting the pairing flag according to the short range wireless signal; and
wherein the processor is configured to execute the computer readable program code to pair with the accepted computing devices falling within the range of the short range wireless signal according to an acceptance of the pairing request by:
uploading the pairing flag to the server, and receiving receiver accounts returned by the server and corresponding to the pairing flag.

12. The computing device according to claim 10, wherein after executing the computer readable program code to receive the reply signal returned, the processor is further configured to execute the computer readable program code to:
send, to the server, an application flag corresponding to a sender account, the application flag corresponding to the receiver accounts.

13. A server, comprising:
a memory, configured to store computer readable program code; and
a processor configured to execute the computer readable program code to:
acquire a sender account and receiver accounts, the receiver accounts corresponding to receiver computing devices falling within a range of a short range wireless signal of an initiator computing device corresponding to the sender account, wherein the receiver computing device and the initiator computing device are paired according to an acceptance of a pairing request broadcast by the initiator computing device, wherein acceptance of the paring request comprises the initiator computing device receiving reply signals from the receiver computing device according to the short range wireless signal, wherein the receiver computing device is related to receiver accounts, and wherein each reply signal comprises an application flag corresponding to one receiver account from the receiver accounts;
receive a service data group sending request uploaded by the initiator computing device, the service data group sending request including a network storage path of service data, wherein a data type of the service data is numerical;
send the network storage path of the service data to the receiver computing devices, wherein the receiver computing devices are configured to download the service data according to the network storage path of the service data; and
perform service numeric transfer between the sender account and the receiver accounts according to the service data.

14. The server according to claim 13, wherein the processor is configured to execute the computer readable program code to acquire the sender account and receiver accounts by:
receiving an uploaded pairing flag and acquiring a sender account corresponding to the uploaded pairing flag; and
receiving a pairing and adding request, acquiring a user account carried in the pairing and adding request when the pairing and adding request comprises a pairing flag, and using the user account as a receiver account, the pairing flag being broadcast by a initiator computing device to the receiver computing devices via the short range wireless signal.

15. The server according to claim 13, wherein the processor is configured to execute the computer readable program code to acquire the sender account and receiver accounts by:
receiving, from the initiator computing device, an uploaded application flag; and
acquiring the sender account and the receiver accounts corresponding to the application flag.

* * * * *